US012105289B2

(12) United States Patent
Khorasaninejad et al.

(10) Patent No.: US 12,105,289 B2
(45) Date of Patent: Oct. 1, 2024

(54) INLINE IN-COUPLING OPTICAL ELEMENTS

(71) Applicant: Magic Leap, Inc., Plantation, FL (US)

(72) Inventors: Mohammadreza Khorasaninejad, Milpitas, CA (US); Victor Kai Liu, Mountain View, CA (US); Dianmin Lin, Los Altos, CA (US); Christophe Peroz, San Francisco, CA (US); Pierre St. Hilaire, Belmont, CA (US)

(73) Assignee: Magic Leap, Inc., Plantation, FL (US)

( * ) Notice: Subject to any disclaimer, the term of this patent is extended or adjusted under 35 U.S.C. 154(b) by 715 days.

(21) Appl. No.: 17/427,355

(22) PCT Filed: Jan. 29, 2020

(86) PCT No.: PCT/US2020/015735
§ 371 (c)(1),
(2) Date: Jul. 30, 2021

(87) PCT Pub. No.: WO2020/160188
PCT Pub. Date: Aug. 6, 2020

(65) Prior Publication Data
US 2022/0099976 A1 Mar. 31, 2022

Related U.S. Application Data

(60) Provisional application No. 62/800,316, filed on Feb. 1, 2019.

(51) Int. Cl.
*G02B 27/01* (2006.01)
*G02B 6/10* (2006.01)
*G02B 6/26* (2006.01)

(52) U.S. Cl.
CPC .......... *G02B 27/0172* (2013.01); *G02B 6/10* (2013.01); *G02B 6/26* (2013.01); *G02B 27/0101* (2013.01); *G02B 2027/0178* (2013.01)

(58) Field of Classification Search
None
See application file for complete search history.

(56) References Cited

U.S. PATENT DOCUMENTS

| 6,850,221 B1 | 2/2005 | Tickle |
| 7,573,640 B2 | 8/2009 | Nivon et al. |

(Continued)

FOREIGN PATENT DOCUMENTS

| CN | 101103299 A | 1/2008 |
| EP | 0 063 447 | 10/1982 |

(Continued)

OTHER PUBLICATIONS

International Search Report and Written Opinion for PCT Application No. PCT/US20/15735, mailed May 22, 2020.

(Continued)

*Primary Examiner* — Robert E. Tallman
(74) *Attorney, Agent, or Firm* — Fish & Richardson P.C.

(57) ABSTRACT

A display system includes a waveguide assembly having a plurality of waveguides, each waveguide associated with an in-coupling optical element configured to in-couple light into the associated waveguide. A projector outputs light from one or more spatially-separated pupils, and at least one of the pupils outputs light of two different ranges of wavelengths. The in-coupling optical elements for two or more waveguides are inline, e.g. vertically aligned, with each other so that the in-coupling optical elements are in the path of light of the two different ranges of wavelengths. The in-coupling optical element of a first waveguide selectively in-couples light of one range of wavelengths into the waveguide, while the in-coupling optical element of a second waveguide selectively in-couples light of another range of wavelengths. Absorptive color filters are provided forward of an in-coupling optical element to limit the propagation of (Continued)

undesired wavelengths of light to that in-coupling optical element.

28 Claims, 19 Drawing Sheets

(56) References Cited

U.S. PATENT DOCUMENTS

| | | | |
|---|---|---|---|
| 9,904,058 | B2 | 2/2018 | Yeoh et al. |
| 10,191,288 | B2* | 1/2019 | Singer .................. G02B 6/0076 |
| 2006/0028436 | A1 | 2/2006 | Armstrong |
| 2007/0081123 | A1 | 4/2007 | Lewis |
| 2011/0277361 | A1* | 11/2011 | Nichol ................. G02B 6/0028 40/541 |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0322810 | A1 | 12/2013 | Robbins |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0002528 | A1 | 1/2015 | Bohn et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2017/0212348 | A1 | 7/2017 | Fu et al. |
| 2018/0180817 | A1 | 6/2018 | Yeoh et al. |
| 2018/0217395 | A1* | 8/2018 | Lin ......................... G02B 1/002 |
| 2018/0231771 | A1 | 8/2018 | Schuck et al. |
| 2018/0239177 | A1* | 8/2018 | Oh ........................ G02B 6/0076 |
| 2018/0275350 | A1* | 9/2018 | Oh ....................... G02B 27/0172 |
| 2018/0341111 | A1 | 11/2018 | Karvonen et al. |

FOREIGN PATENT DOCUMENTS

| | | |
|---|---|---|
| JP | 2008523434 A | 7/2008 |
| JP | 2015099238 A | 5/2015 |
| WO | WO 2020/160188 | 8/2000 |
| WO | 2018175653 A1 | 9/2018 |

OTHER PUBLICATIONS

International Preliminary Report on Patentability for PCT Application No. PCT/US20/15735, issued Jul. 27, 2021.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Office Action in Japanese Appln. No. 2021-544182, dated Jan. 5, 2024, 18 pages (with English translation).
Extended European Search Report in European Appln. No. 20749337.0, dated Oct. 5, 2022, 9 pages.

* cited by examiner

INLINE IN-COUPLING OPTICAL ELEMENTS

PRIORITY CLAIM

This application claims priority from U.S. Provisional Application No. 62/800,316, filed Feb. 1, 2019 and entitled "INLINE IN-COUPLING OPTICAL ELEMENTS," which is hereby incorporated by reference in its entirety.

BACKGROUND

Field

The present disclosure relates to optical systems, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

A head mounted display system may be configured to project light to an eye of a user to display augmented reality image content in a vision field of the user. The head-mounted display system may include a frame that is configured to be supported on a head of the user. The head-mounted display system may also include an eyepiece disposed on the frame. At least a portion of the eyepiece may be transparent and/or disposed at a location in front of the user's eye when the user wears the head-mounted display such that the transparent portion transmits light from the environment in front of the user to the user's eye to provide a view of that environment in front of the user. The eyepiece may include one or more waveguides disposed to direct light into the user's eye to form augmented reality image content.

Various embodiments of the head mounted display system comprise a projector having a pupil that outputs light (e.g., image light) having a plurality of ranges of wavelengths (e.g., two or three ranges of wavelengths). Each range of wavelengths may include one or more wavelengths. In some embodiments, the head mounted display system comprises a waveguide assembly comprising a plurality of waveguides stacked over each other and configured to receive light having a plurality of ranges of wavelengths outputted from a pupil of the projector. Each waveguide in the plurality of waveguides may comprise an in-coupling optical element configured to in-couple light of one of the plurality of ranges of wavelengths from the light outputted from the pupil of the projector. Various embodiments of the head mounted display system may comprise a projector having two separated pupils, one of the separated pupils being configured to output light having a first wavelength range and a second wavelength range different from the first wavelength range; and another of the separated pupils is configured to output light of a third wavelength range different from the first wavelength range and the second wavelength range. In some such embodiments, the head mounted display system comprises a waveguide assembly comprising at least three waveguides stacked over each other and configured to receive light of the first wavelength range, the second wavelength range, and the third wavelength range outputted from the two separated pupils of the projector. Each of the at least three waveguides in the waveguide assembly comprise a first in-coupling optical element configured to in-couple light of the first wavelength range, a second in-coupling optical element configured to in-couple light of the second wavelength range, and a third in-coupling optical element configured to in-couple light of the third wavelength range. The first in-coupling optical element and the second in-coupling optical element are configured to in-couple light of the first and the second wavelength ranges output from one of the separated pupils. The first in-coupling optical element and the second in-coupling optical element may at least partially spatially overlap while the third in-coupling optical element configured to in-couple light of the third wavelength may be spatially separated from the first in-coupling optical element and the second in-coupling optical element.

In some embodiments, a display system is provided. The display system comprises a projection system for outputting image light for forming a full-color image. The display system also comprises a stack of waveguides. The stack of waveguides comprises a first waveguide having a first in-coupling optical element configured to receive the image light and to in-couple image light of a first component color. The stack of waveguides also comprises a second waveguide underlying the first waveguide, and having a second in-coupling optical element configured to receive the image light and to in-couple image light of a second component color. The first in-coupling optical element and the second in-coupling optical element are laterally displaced relative to one another by 5-50% of a shortest width of the first and second in-coupling optical elements, as seen in a top-down view.

In some embodiments, the first in-coupling optical element and the second in-coupling optical element are laterally displaced relative to one another by 10-25% of the shortest width of the first and second in-coupling optical elements, as seen in a top-down view. In some embodiments, the projection system has a single exit-pupil for outputting the image light. In some embodiments, the display system further comprises a color filter in a light path of the image light, the color filter disposed between the first and second in-coupling optical elements. The color filter may be laterally displaced relative to the first in-coupling optical element by the same amount as the second in-coupling optical element. In some embodiments, the color filter is an absorptive color filter. In some embodiments, the display system may further comprise a third waveguide underlying the second waveguide, and having a third in-coupling optical element configured to receive the image light and to in-couple image light of a third component color. In some embodiments, the third in-coupling optical element is laterally displaced relative to the second in-coupling optical element by 5-50% of a shortest width of the second and third in-coupling optical elements, as seen in a top-down view. In some embodiments, the first, second, and third in-coupling optical elements constitute a first set of waveguides for forming images on a first depth plane, and the display system further comprises a second set of waveguides for forming images on a second depth plane, wherein the first and second set of waveguides output light with different amounts of wavefront divergence from one another. In some embodiments, the second set of waveguides comprises fourth, fifth, and sixth waveguides, each having respective fourth, fifth, and sixth in-coupling optical elements. In some embodiments, the fourth in-coupling optical element and the fifth in-coupling optical element are laterally displaced relative to one another by 5-50% of a shortest width of the fourth and fifth in-coupling optical elements, as seen in a top-down view. In some embodiments, the fifth in-coupling optical element and the sixth in-coupling optical element are laterally displaced relative to one another by 5-50% of a shortest width of the fifth and sixth in-coupling optical elements, as seen in a top-down view.

The systems, methods and devices disclosed herein each have several innovative aspects, no single one of which is solely responsible for the desirable attributes disclosed herein. A variety of example systems and methods are provided below.

Example 1: A display system comprising:
a stack of waveguides comprising:
  a first absorptive optical filter transmissive to light of a first range of wavelengths and absorptive to light of wavelengths different from the first range of wavelengths;
  a first in-coupling optical element configured to receive light transmitted through the first absorptive optical filter; and
  a first waveguide having a first major surface and a second major surface,
  wherein the first in-coupling optical element is configured to incouple light of the first range of wavelengths into the first waveguide.

Example 2: The display system of Example 1, wherein the first in-coupling optical element is on the first major surface of the first waveguide or the second major surface of the first waveguide.

Example 3: The display system of any of Examples 1-2, further comprising a second absorptive optical filter on one or both of the first or second major surfaces of the first waveguide, wherein, as seen in a top-down view, the first absorptive optical filter is laterally displaced from the second absorptive optical filter.

Example 4: The display system of any of Examples 1-3, wherein the first absorptive optical filter comprises a dye.

Example 5: The display system of any of Examples 1-4, wherein the first in-coupling optical element is configured to transmit light having a range of wavelengths different from the first range of wavelengths.

Example 6: The display system of any of Examples 1-5, wherein the stack of waveguides further comprises:
  a second waveguide having a first major surface and a second major surface;
  a second in-coupling optical element configured to incouple light, transmitted through the first absorptive optical filter and the first in-coupling optical element and having a second range of wavelengths different from the first range of wavelengths, into the second waveguide.

Example 7: The display system of Example 6, wherein the second in-coupling optical element is on the first major surface of the second waveguide or the second major surface of the second waveguide.

Example 8: The display system of any of Examples 6-7, wherein at least a portion of the first in-coupling optical element and at least a portion of the second in-coupling optical element laterally overlap with each other, as seen in a top down view.

Example 9: The display system of any of Examples 7-8, wherein the second waveguide is forward of the first waveguide, further comprising:
  a third absorptive optical filter on a major surface of the second waveguide and laterally displaced from the second in-coupling optical element, the third absorptive optical filter configured to absorb incoupled light having a wavelength different from the second range of wavelengths.

Example 10: The display system of Example 9, wherein the third absorptive optical filter comprises a dye.

Example 11: The display system of any of Examples 6-10, further comprising:
  a third waveguide rearward of the first waveguide, the third waveguide having a first major surface and a second major surface; and
  a third in-coupling optical element configured to incouple light, from the incoming beam of light, having a third wavelength range into the third waveguide.

Example 12: The display system of Example 11, wherein the third in-coupling optical element is on one of the first major surface of the third waveguide or the second major surface of the third waveguide.

Example 13: The display system of any of Examples 11-12, wherein at least a portion of the third in-coupling optical element laterally overlaps with the first in-coupling optical element and the second in-coupling optical element.

Example 14: The display system of any of Examples 11-13, further comprising a fourth absorptive optical filter forward of the third in-coupling optical element and between the second waveguide and the third waveguide.

Example 15: The display system of Example 14, wherein the third optical filter comprises a dye.

Example 16: A display system comprising:
a stack of waveguide assemblies comprising:
  a first waveguide assembly comprising:
    a first waveguide having a first major surface and a second major surface; and
    a first in-coupling optical element configured to receive a first incoming beam of light;
    wherein the first in-coupling optical element is configured to incouple into the first waveguide light, from the incoming beam of light, having a first wavelength range; and a second waveguide assembly comprising:
  a second waveguide having a first major surface and a second major surface; and
  a second in-coupling optical element configured to receive a second incoming beam of light;
  wherein the second in-coupling optical element is configured to incouple into the second waveguide light, from the second incoming beam of light, having a second wavelength range,
  wherein the first in-coupling optical element and the second in-coupling optical element are laterally displaced from each other as seen in a top-down view facing major surfaces of the first and second waveguides.

Example 17: The display system of Example 16, wherein the stack of waveguide assemblies comprises:
a third waveguide assembly comprising:
a third waveguide having a first major surface and a second major surface;
a third in-coupling optical element configured to receive the first incoming beam of light, wherein the third in-coupling optical element is configured to incouple into the third waveguide light, from the incoming beam of light, having a third wavelength range different from the first wavelength range and the second wavelength range; and
an optical filter between the first waveguide and the third waveguide, the optical filter configured to absorb light, from the incoming beam of light, having the first wavelength and transmit light, from the incoming beam of light, having the third wavelength range.

Example 18: The display system of Example 17, wherein at least a portion of the first in-coupling optical element overlaps with a portion of the third incoming optical element, as seen in the top-down view.

Example 19: The display system of any of Examples 17-18, further comprising a second optical filter on one of the first or second major surfaces of the first waveguide, the second optical filter laterally displaced from the first in-coupling optical element, as seen in the top-down view, wherein the second optical filter configured to absorb incoupled light in the first waveguide having a wavelength range different from the first wavelength range.

Example 20: The display system of any of Examples 17-19, further comprising a third optical filter on one of the first or second major surfaces of the second waveguide, the third optical filter laterally displaced from the second in-coupling optical element, the third optical filter configured to absorb incoupled light in the second waveguide having a wavelength range different from the second wavelength range.

Example 21: The display system of any of Examples 17-20, further comprising a fourth optical filter on one of the first or second major surfaces of the third waveguide, wherein the fourth optical filter is between the second waveguide and the third waveguide, the fourth optical filter configured to:
absorb light having the first wavelength range and the second wavelength range and transmit light having the third wavelength range.

Example 22: A display system comprising:
a projection system for outputting image light for forming a full-color image;
a stack of waveguides comprising:
  a first waveguide having a first in-coupling optical element configured to receive the image light and to in-couple image light of a first component color; and
  a second waveguide underlying the first waveguide, and having a second in-coupling optical element configured to receive the image light and to in-couple image light of a second component color,
  wherein the first in-coupling optical element and the second in-coupling optical element are laterally displaced relative to one another by 5-50% of a shortest width of the first and second in-coupling optical elements, as seen in a top-down view.

Example 23: The display system of Example 22, wherein the first in-coupling optical element and the second in-coupling optical element are laterally displaced relative to one another by 10-25% of the shortest width of the first and second in-coupling optical elements, as seen in a top-down view.

Example 24: The display system of Example 22, wherein the projection system has a single exit-pupil for outputting the image light.

Example 25: The display system of Example 22, further comprising a color filter in a light path of the image light, the color filter disposed between the first and second in-coupling optical elements.

Example 26: The display system of Example 25, wherein the color filter is laterally displaced relative to the first in-coupling optical element by the same amount as the second in-coupling optical element.

Example 27: The display system of Example 25, wherein the color filter is an absorptive color filter.

Example 28: The display system of Example 22, further comprising a third waveguide underlying the second waveguide, and having a third in-coupling optical element configured to receive the image light and to in-couple image light of a third component color.

Example 29: The display system of Example 28, wherein the third in-coupling optical element is laterally displaced relative to the second in-coupling optical element by 5-50% of a shortest width of the second and third in-coupling optical elements, as seen in a top-down view.

Example 30: The display system of Example 28, wherein the first, second, and third in-coupling optical elements constitute a first set of waveguides for forming images on a first depth plane,
further comprising a second set of waveguides for forming images on a second depth plane, wherein the first and second set of waveguides output light with different amounts of wavefront divergence from one another.

Example 31: The display system of Example 30, wherein the second set of waveguides comprises fourth, fifth, and sixth waveguides, each having respective fourth, fifth, and sixth in-coupling optical elements.

Example 32: The display system of Example 31, wherein the fourth in-coupling optical element and the fifth in-coupling optical element are laterally displaced relative to one another by 5-50% of a shortest width of the fourth and fifth in-coupling optical elements, as seen in a top-down view.

Example 33: The display system of Example 32, wherein the fifth in-coupling optical element and the sixth in-coupling optical element are laterally displaced relative to one another by 5-50% of a shortest width of the fifth and sixth in-coupling optical elements, as seen in a top-down view.

BRIEF DESCRIPTION OF THE DRAWINGS

The drawings are provided to illustrate example embodiments and are not intended to limit the scope of the disclosure. Like reference numerals refer to like parts throughout.

DETAILED DESCRIPTION

Figure 1:
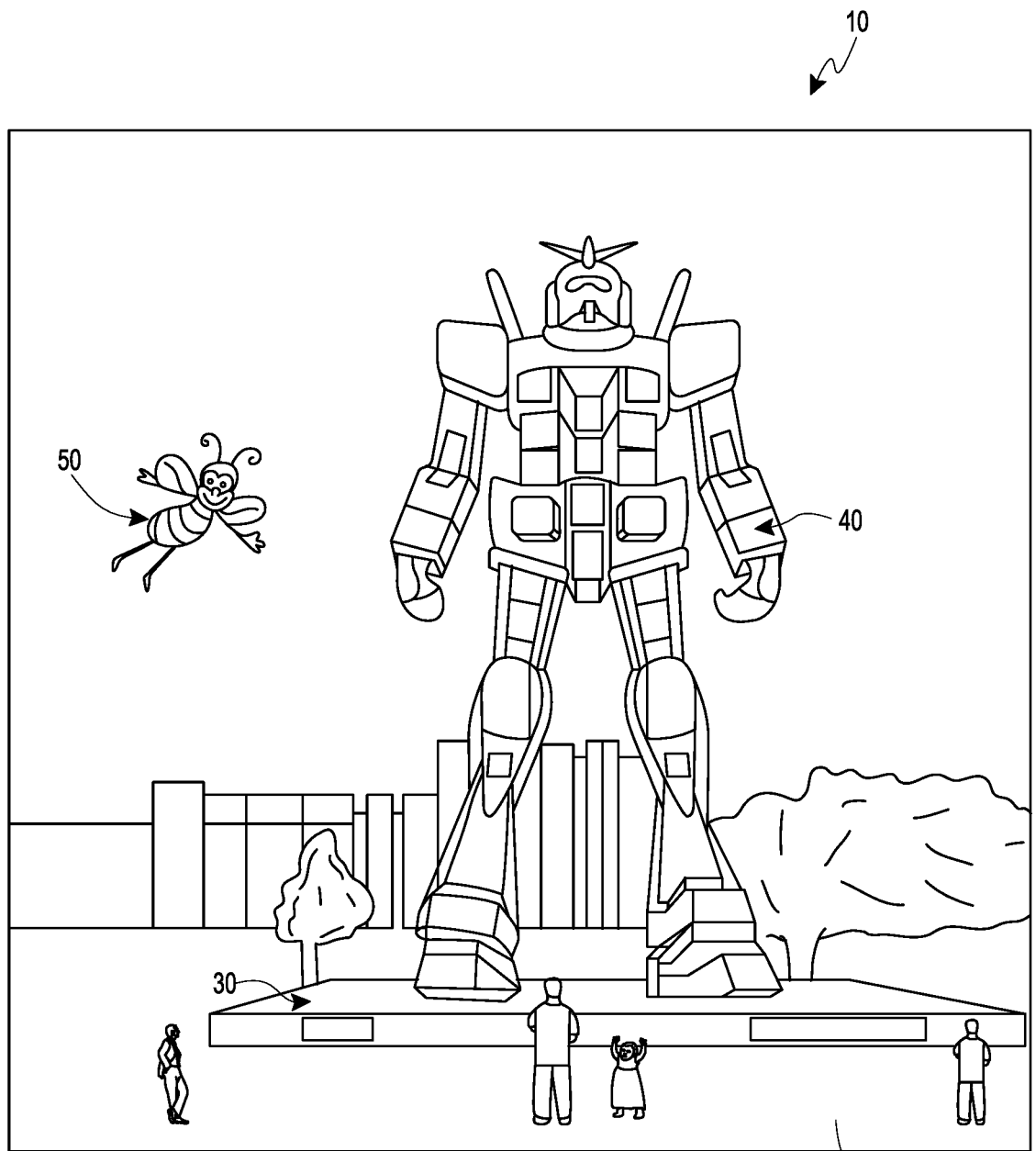
FIG. 1 illustrates a user's view of augmented reality (AR) through an AR device, according to some embodiments.

VR and AR experiences may be provided by display systems having displays in which images corresponding to a plurality of depth planes are provided to a viewer. The images may be different for each depth plane (e.g. provide slightly different presentations of a scene or object) and may be separately focused by the viewer's eyes, thereby helping to provide the user with depth cues based on the accommodation of the eye. It will be appreciated that the accommodation of the eye may bring into focus different content located on different depth planes in a scene. As discussed herein, such depth cues aid in providing credible perceptions of depth by the viewer.

In some configurations, a full color image may be formed for the various depth planes by overlaying component images that each have a particular component color. For example, red, green, and blue images may each be outputted to form each full color image. As a result, each depth plane may have multiple component color images associated with it. As disclosed herein, the component color images may be outputted using waveguides that in-couple light containing image information, distribute the in-coupled light across the waveguides, and then outcouple light towards a viewer. Light may be in-coupled into the waveguide using in-coupling optical elements, such as diffractive elements, and then outcoupled out of the waveguide using outcoupling optical elements, which may also be diffractive elements.

The images for the different depth planes may be generated by a projector that outputs light from a plurality of spatially-separated pupils. For example, the projector may be configured to output the multiple component color images for different depth planes from a plurality of spatially-separated pupils. Consider a display system configured to present color images at two different depth planes to a user, using three component color images to form each full color image. Some such embodiments of a display system may comprise a first set of three waveguides stacked over each other for a first depth plane and a second set of three waveguides stacked over each other for a second depth plane. The first and the second set of waveguides may be stacked over each other. Each waveguide in the first and the second set of three waveguides may be configured to output an image at one color (e.g., blue, green or red) to a viewer. In such embodiments of the display system, the projector may be configured to have six (6) spatially-separated pupils.

A first set of three spatially-separated pupils may be configured to output red, green and blue images for the first depth plane and a second set of three spatially-separated pupils may be configured to output red, green and blue images for the second depth plane.

Without relying on any particular theory, the fewer pupils that are output from the projector, the smaller the projector may typically be. Accordingly, reducing the number of spatially-separated pupils that is output by the projector may advantageously reduce a size of the projector, which in turn may reduce the overall size of the display system. Accordingly, to reduce the footprint of the projector and, thus, the overall display system, it may be advantageous to configure the projector in the example of the display system discussed above to output light in less than six (6) spatially-separated pupils.

For example, the projector may be configured to output light of a first wavelength (e.g., a red wavelength) and a second wavelength different from the first wavelength (e.g., a blue wavelength) for the first depth plane from a first pupil and output light of a third wavelength (e.g., a green wavelength) for the first depth plane from a second pupil spatially separated from the first pupil. Thus, instead of having three spatially-separated pupils outputting light of first wavelength, second wavelength and third wavelengths for the first depth plane, two spatially-separated pupils are used to output light of the three different wavelengths for the first depth plane. It will be appreciated that references to a single wavelength (e.g., red, green, or blue) are made herein for brevity and ease of description, and references to the single wavelength should be understood to include a range of wavelengths that encompass the single wavelength.

In this example, the first in-coupling optical element is configured to in-couple light of the first wavelength and the second in-coupling optical element is configured to in-couple light of the second wavelength in the first set of waveguides configured to output an image at the first depth plane. The in-coupling optical elements may be vertically aligned with each other such that at least a portion of the first in-coupling optical element partially spatially overlaps with the second in-coupling optical element, as seen in a top down view, so as to receive light in the first wavelength and the second wavelength outputted from the first pupil; stated another way, the in-coupling optical elements may be inline in the sense that the in-coupling optical elements are in the path of light output from the same projector pupil. The third in-coupling optical element is disposed to receive light of the third wavelength from the second pupil which is spatially separated from the first pupil. Thus, the third in-coupling optical element need not be vertically aligned with the first in-coupling optical element and the second in-coupling optical element but instead may be spatially separated from the first in-coupling optical element and the second in-coupling optical element. Accordingly, the third in-coupling optical element need not spatially overlap (either partially or completely) with the first in-coupling optical element and the second in-coupling optical element.

As another example, the projector may be configured to output light of a first wavelength (e.g., a red wavelength), a second wavelength different from the first wavelength (e.g., a blue wavelength) and a third wavelength (e.g., a green wavelength) for the first depth plane from a single pupil. Thus, instead of having three spatially-separated pupils outputting light of first wavelength, second wavelength and third wavelengths for the first depth plane, a single pupil is used to output light of the three different wavelengths for the first depth plane.

In this example, the first in-coupling optical element is configured to in-couple light of the first wavelength, the second in-coupling optical element is configured to in-couple light of the second wavelength and the third in-coupling optical element is configured to in-couple light of the third wavelength in the first set of waveguides. The first, second, and third in-coupling optical elements may be vertically aligned such that they spatially overlap with each other so as to receive light in the first wavelength, the second wavelength, and the third wavelength outputted from the single-pupil.

In various embodiments, the first and/or the second sets of waveguides may comprise one or more wavelength selective (also referred to as color filters) to reduce crosstalk between in-coupled light of different wavelengths and/or reduce ghosting. Preferably, the color filters are absorptive color filters, e.g., layers of light absorbing material. In some embodiments, the color filters may be placed between pairs of vertically-aligned in-coupling optical elements. It will be appreciated that an in-coupling optical element may not incouple all of the incident light of a particular wavelength into an associated waveguide, such that some of the light of that wavelength propagates to an underlying in-coupling optical element configured to incouple light of another wavelength. To limit the propagation of undesired wavelengths of light from a first to a second in-coupling optical element, a color filter configured to absorb undesired wavelengths of light may be provided between those in-coupling optical elements. In addition, in some embodiments, color filters may be provided on one or both major surfaces of a waveguide to absorb unintentionally incoupled light propagating through the waveguide.

Reference will now be made to the figures, in which like reference numerals refer to like parts throughout.

Figure 2:
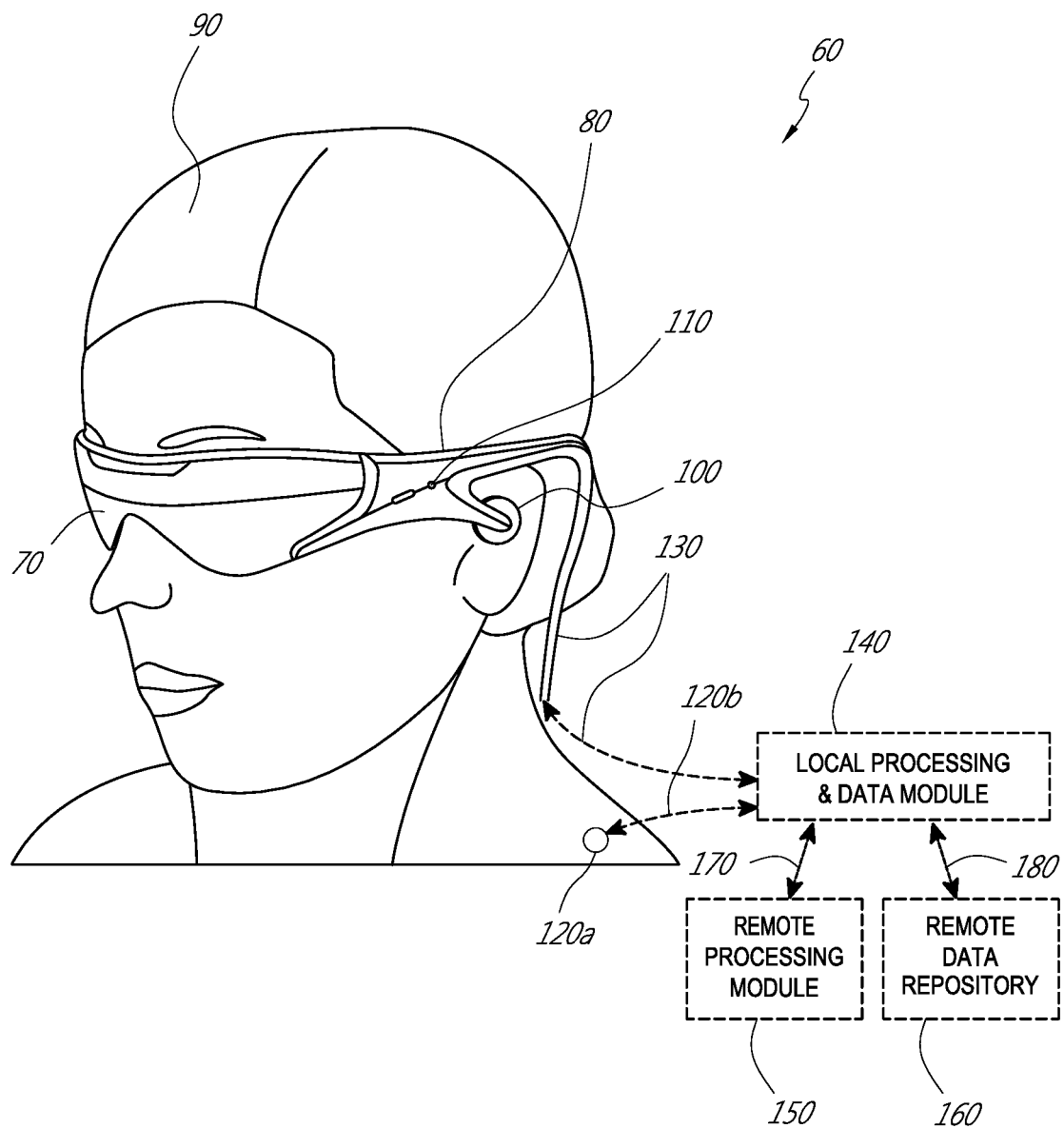
FIG. 2 illustrates an example of wearable display system, according to some embodiments.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
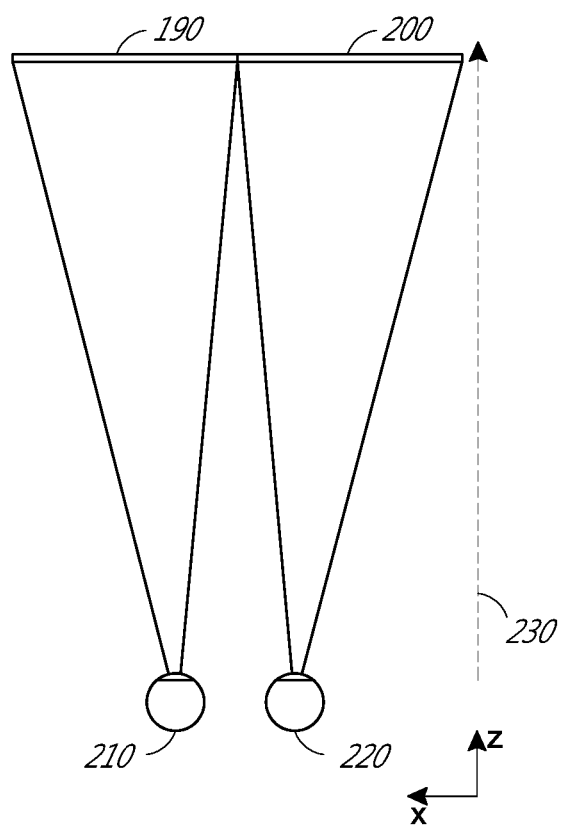
FIG. 3 illustrates a display system for simulating three-dimensional imagery for a user, according to some embodiments.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
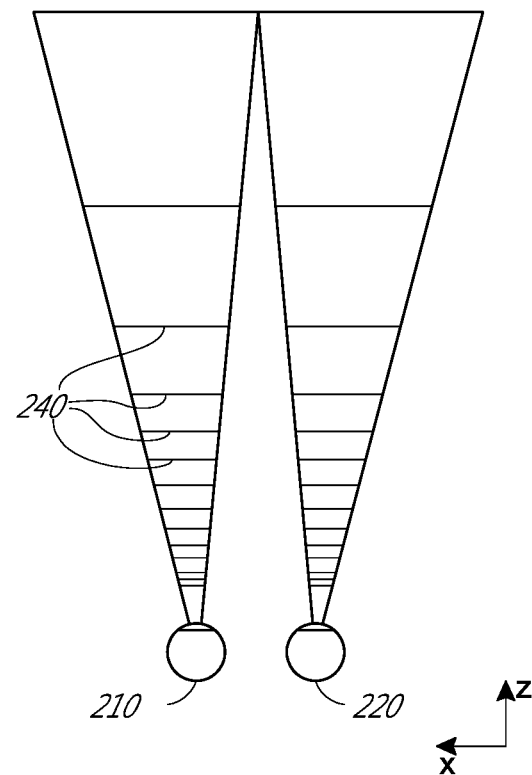
FIG. 4 illustrates aspects of an approach for simulating three-dimensional imagery using multiple depth planes, according to some embodiments.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
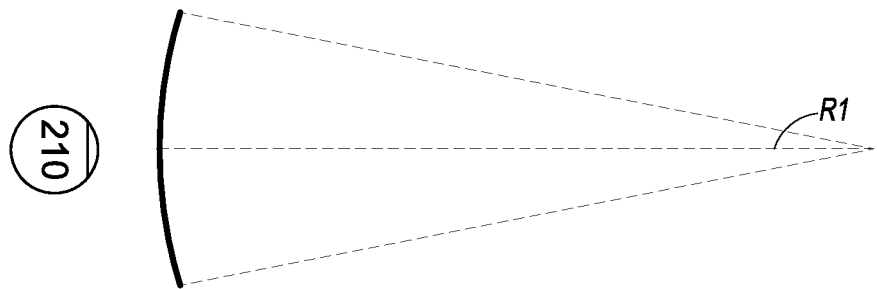
FIGS. 5A-5C illustrate relationships between radius of curvature and focal radius, according to some embodiments.
Figure 5B:
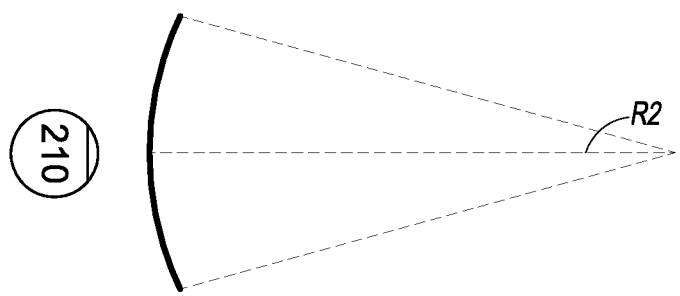
Figure 5C:
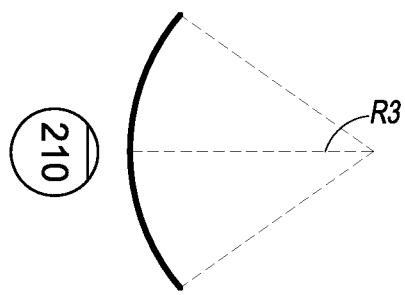

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
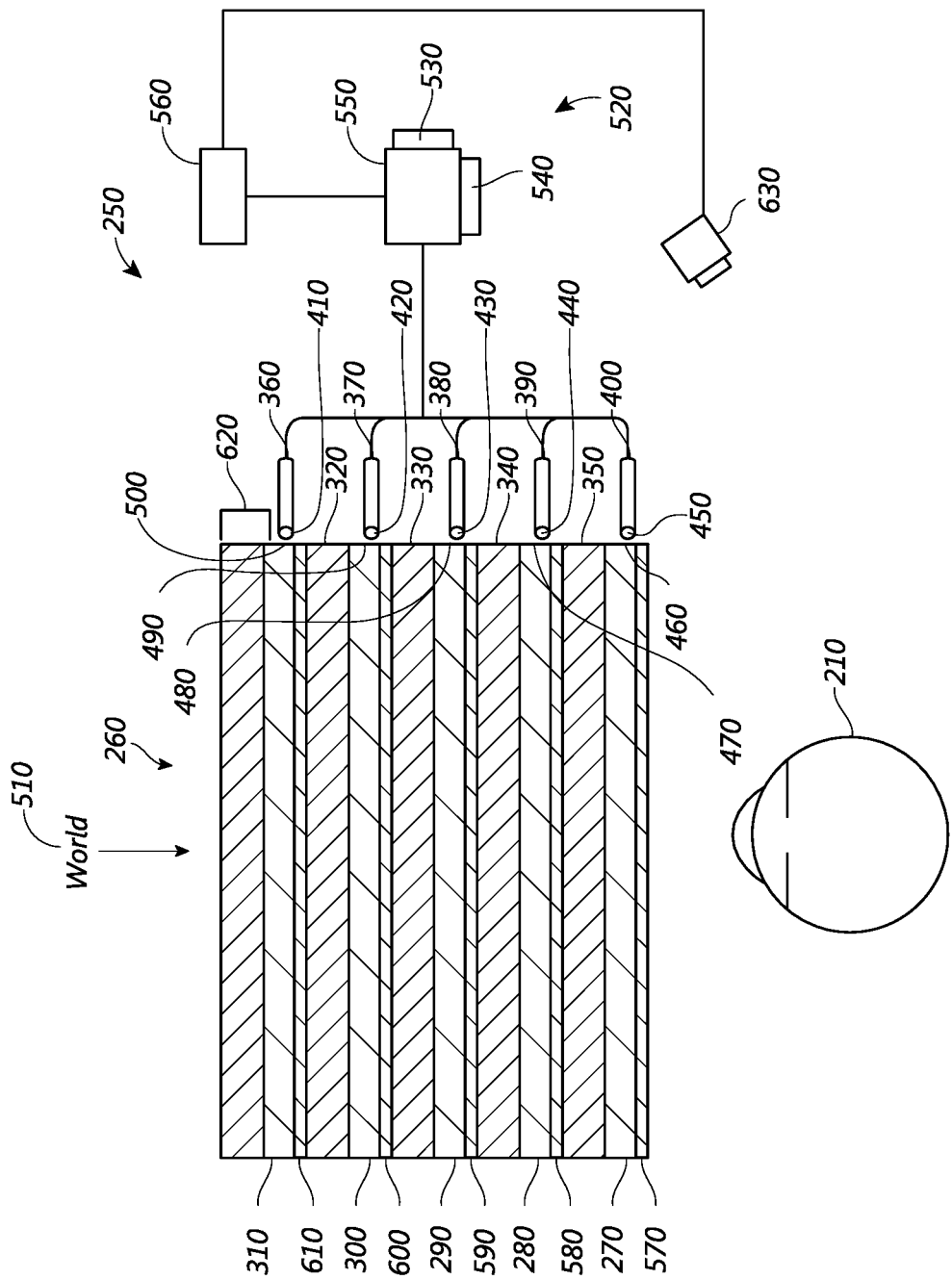
FIG. 6 illustrates an example of a waveguide stack for outputting image information to a user, according to some embodiments.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 540 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
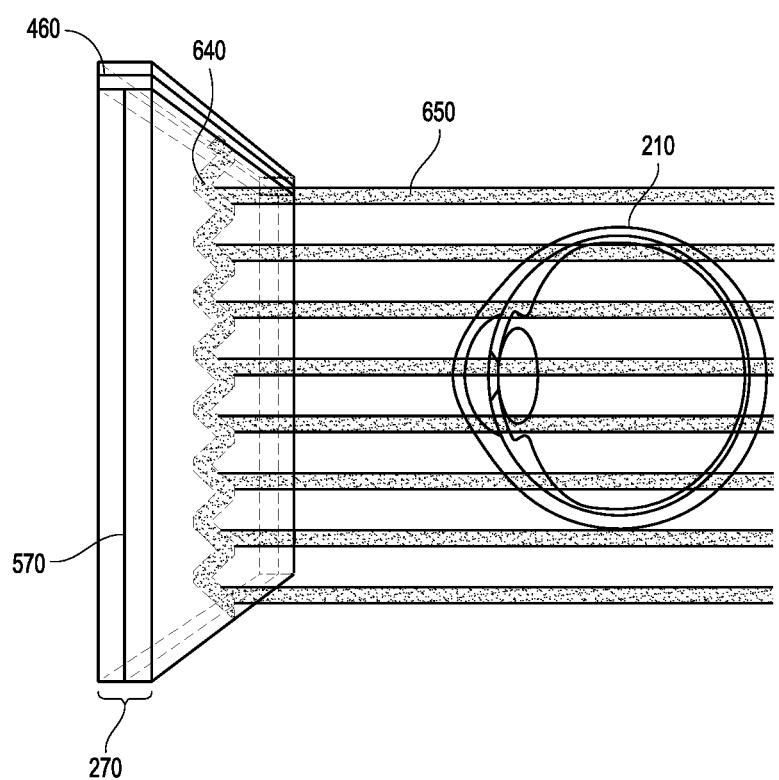
FIG. 7 illustrates an example of exit beams outputted by a waveguide, according to some embodiments.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
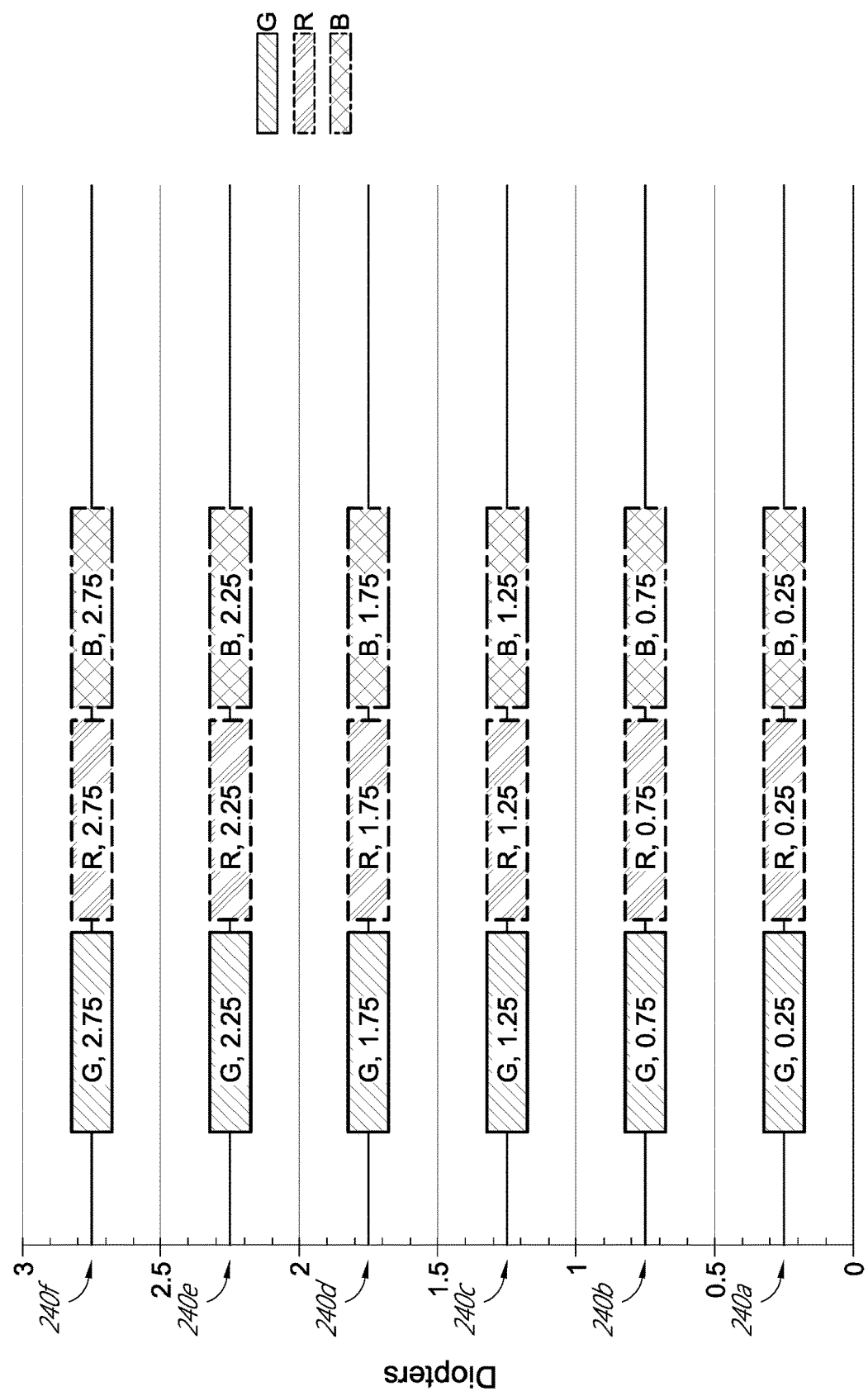
FIG. 8 illustrates an example of a stacked waveguide assembly in which each depth plane includes images formed using multiple different component colors, according to some embodiments.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
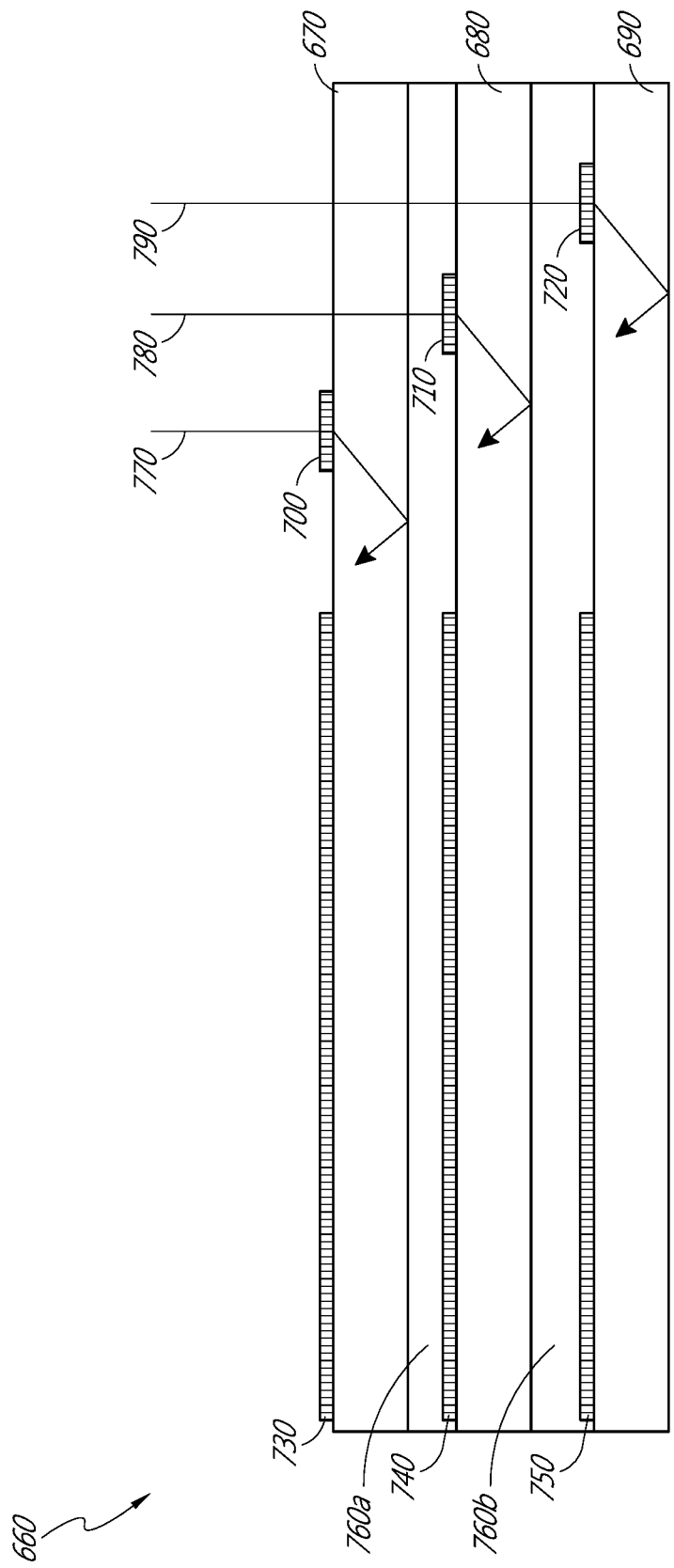
FIG. 9A illustrates a cross-sectional side view of an example of a set of stacked waveguides that each includes an in-coupling optical element, according to some embodiments.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. The waveguide 670 is forward of, or closer to a source of image light than the waveguide 680, and the waveguide 690 is rearward of, or farther from the source of image light than the waveguide 680. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6). The light rays 770, 780, 790 may constitute image light, light encoded with image information. For example, the light may have been spatially modulated or otherwise provided with different intensities and/or different wavelengths at different locations to, e.g., form pixels forming an image.

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
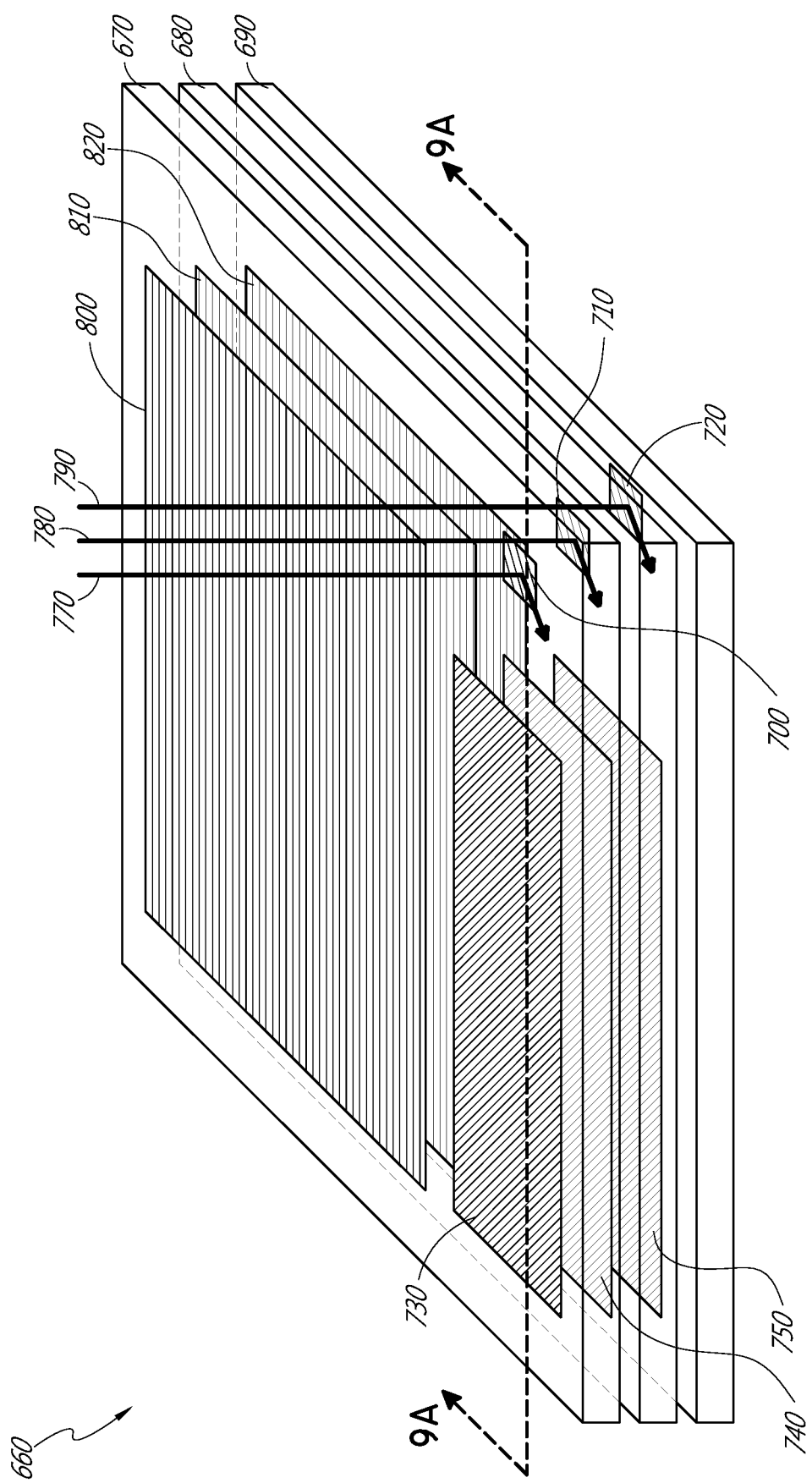
FIG. 9B illustrates a perspective view of an example of the set of stacked waveguides of FIG. 9A, according to some embodiments.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
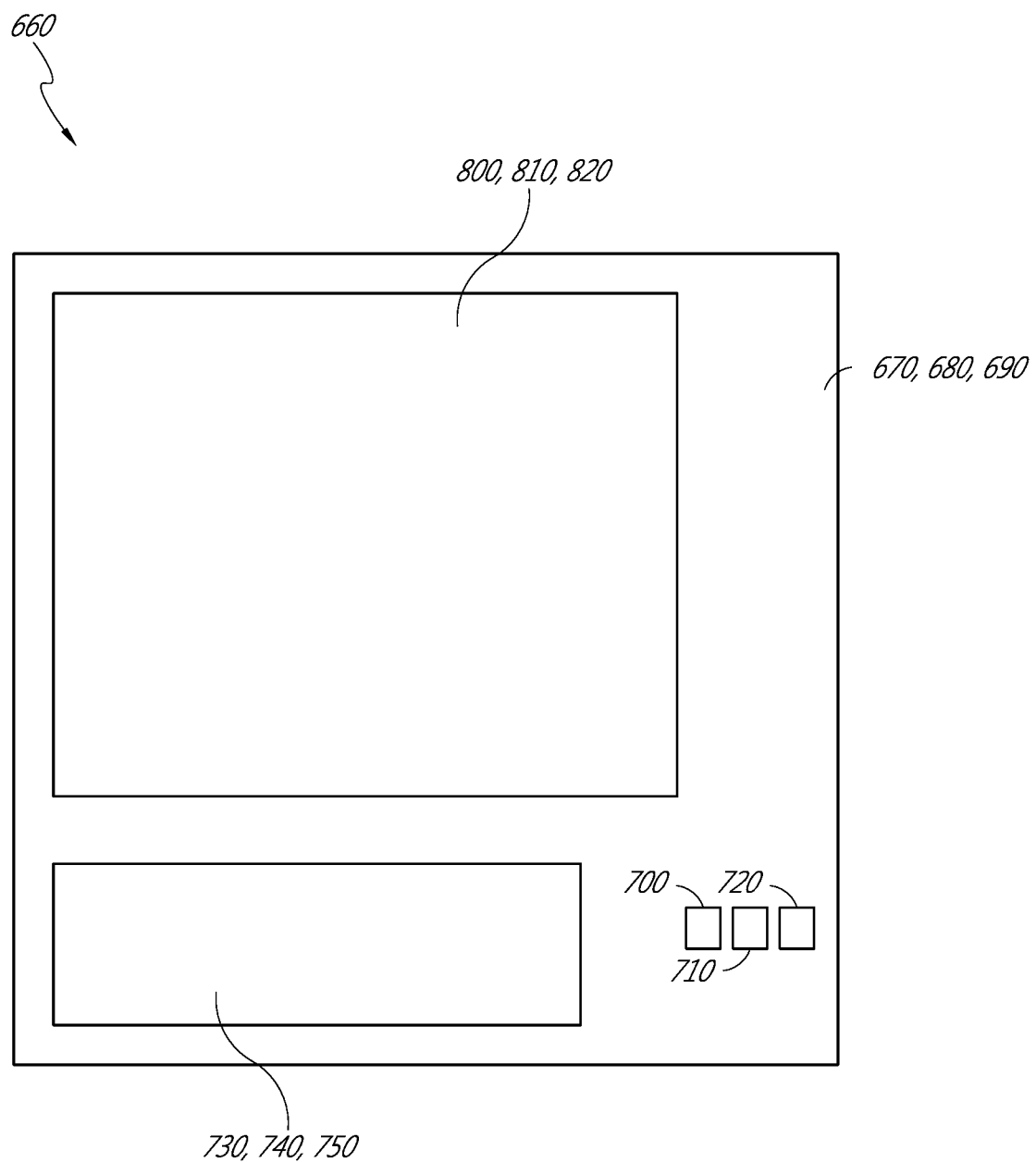
FIG. 9C illustrates a top-down plan view of an example of the set of stacked waveguides of FIGS. 9A and 9B, according to some embodiments.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted or split pupil system, and the in-coupling optical elements within these arrangements may correspond to sub pupils.

Some embodiments of the wearable display system 60 (FIG. 2) may include a display 70 comprising a split-pupil waveguide assembly. For example, various embodiments of the waveguide assembly 260 or 660 (FIGS. 6 and 9A-9C) may be configured as a split-pupil waveguide assembly. As an example, the split-pupil waveguide assembly may comprise six waveguides, each waveguide associated with an in-coupling optical element configured to receive light output from a projector and in-couple light having a specific optical property (e.g., a particular wavelength, a range of wavelengths and/or a particular state of polarization) into the waveguide. A first set of three waveguides may be configured to receive red, green and blue light that produce a red image, a green image and a blue image at a first depth plane and a second set of the three waveguides may be configured to receive red, green and blue light that produce a red image, a green image and a blue image at a second depth plane. It will be appreciated that more or fewer component colors are possible and that the number of depths planes may also vary as desired.

The projector associated with such a display system may be configured to output light from a plurality of spatially-separated pupils directed towards the split-pupil waveguide assembly. For example, in some embodiments, the projector associated with a display comprising a split-pupil waveguide assembly can comprise six spatially-separated exit pupils (also referred to simply as pupils herein, with the identity of the pupils as exit pupils being apparent from context). As an example, a first set of three spatially-separated pupils may be configured to output red, green and blue images for a first depth plane and a second set of three spatially-separated pupils may be configured to output red, green and blue images for a second depth plane. Light from each of the six spatially-separated pupils is in-coupled into a corresponding one of the waveguides of the waveguide assembly. As another example, in some embodiments, the projector associated with a display comprising a split-pupil waveguide assembly can comprise two spatially-separated pupils. A first spatially-separated pupil is configured to output red, green and blue images for a first depth plane and a second spatially-separated pupil is configured to output red, green and blue images for a second depth plane. Light from the first spatially-separated pupil is in-coupled into a corresponding one of the first set of waveguides (e.g., three waveguides, one for each component color) associated with the first depth plane and light from the second spatially-separated pupil is in-coupled into a corresponding one of the second set of waveguides (e.g., three waveguides, one for each component color) associated with the second depth plane.

In some embodiments, the in-coupling optical elements may be diffractive gratings. For example, the in-coupling optical elements can comprise blazed gratings. In various embodiments, high refractive index dielectric material can be disposed over the blazed gratings. Each of the constituent waveguides of the split-pupil waveguide assembly may comprise an in-coupling grating (ICG) spatially aligned with one of the plurality of spatially-separated pupils of the projector. For example, the waveguide configured to produce a red image at a first depth plane may comprise an in-coupling grating (ICG) positioned such that it subtends the corresponding pupil of the projector that is configured to output red image at the first depth plane. As another example, the waveguide configured to produce a green image at a second depth plane may comprise an in-coupling grating (ICG) positioned such that it subtends the corresponding pupil of the projector that is configured to output green image at the second depth plane.

Accordingly, various embodiments of display systems may comprise a plurality of waveguides, each waveguide comprising an in-coupling grating configured to receive and in-couple light output from a corresponding pupil of a projector into the waveguide. The number of pupils from which light is output from the projector in such embodiments may be equal to the number of waveguides in the plurality of waveguides or equal to the number of depth planes. The in-coupling optical element associated with each waveguide may be configured to facilitate high in-coupling efficiency of light of the desired color into that waveguide.

As discussed above, the size of the projector may depend on the number of pupils that the projector outputs. For example, the size of the projector may be reduced if the number of pupils from which a projector outputs light is reduced. Without relying on any particular theory, the overall size of the display system may also be reduced if the number of pupils from which a projector outputs light is reduced. For example, to reduce the size of the projector, the projector may be configured to output two different color images (e.g., blue image and red image) for a depth plane from a first pupil while the third different color image (e.g., green image) for the depth plane may be output from a second pupil spatially separated from the first pupil. Preferably, the colors sharing a common pupil are chosen to provide the largest difference in wavelength (e.g., in a set of component color images, to aid in the discrimination of the in-coupling optical elements between different component colors. As another example, to reduce the size of the projector, the projector may be configured to output three different color images for a depth plane (e.g., blue image, red image, and green image) from a single-pupil as discussed above.

Thus, to reduce the size of the projector and/or the overall size of the display system, the number of pupils from which the projector outputs light may be lesser than the number of waveguides in the plurality of waveguides. In embodiments of a display system comprising a projector that outputs different color images for a depth plane (e.g., two or three color images) from a single pupil, the in-coupling optical elements associated with the waveguides that receive the different color images output from the single pupil of the projector are aligned (e.g., vertically aligned) such that they appear to spatially overlap, as seen in a top-down view. Waveguide architectures in which the in-coupling optical elements are vertically aligned such that they may receive different color images (e.g., two or three color images) from a single pupil of a projector are discussed herein. Additionally, methods and systems that are configured to reduce or prevent in-coupling of an unintended color image into a waveguide are also described in this application.

Figure 10:
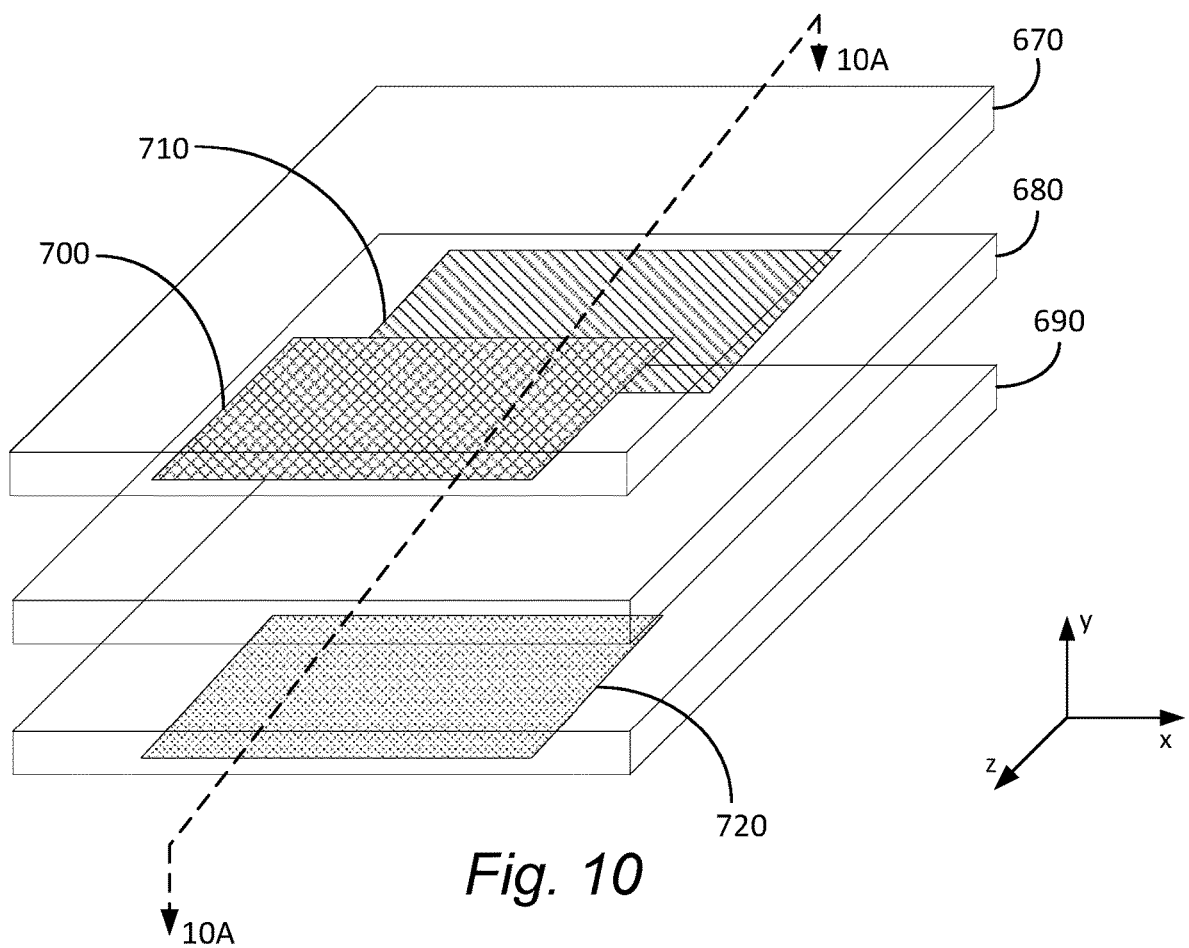
FIG. 10 schematically illustrates a perspective view of an example of a split-pupil waveguide assembly comprising a plurality of waveguides stacked over each other and in-coupling optical elements configured to in-couple light output from a projector outputting image light from two spatially-separated pupils.

FIG. 10 schematically illustrates a perspective view of an example of a split-pupil waveguide assembly comprising a plurality of waveguides stacked over each other. Each waveguide in the plurality of waveguides is associated with an in-coupling optical element configured in-couple light having a specific optical property (e.g., a particular wavelength, a range of wavelengths and/or a particular state of polarization). The illustrated embodiment comprises three waveguides 670, 680, and 690 stacked over each other. Each waveguide is associated with an in-coupling optical element (e.g., in-coupling optical elements 700, 710 and 720) that are configured to in-couple light having different wavelengths output from a projector. The projector may be configured to output a plurality of different color images (e.g., blue and red color images) from a first pupil and one or more different color images (e.g., green image) from a second pupil spatially separated from the first pupil. Accordingly, in the embodiment illustrated in FIG. 10, in-coupling optical elements 700 and 720 are vertically aligned with each other (e.g., along the y-axis) such that they spatially overlap with each other laterally (e.g., in the x-z plane) and coincide with the first pupil of the projector, while the in-coupling optical element 710 is laterally (e.g., in the x-z plane) displaced from the in-coupling optical elements 700 and 720 and coincides with the second pupil of the projector.

Figure 10A:
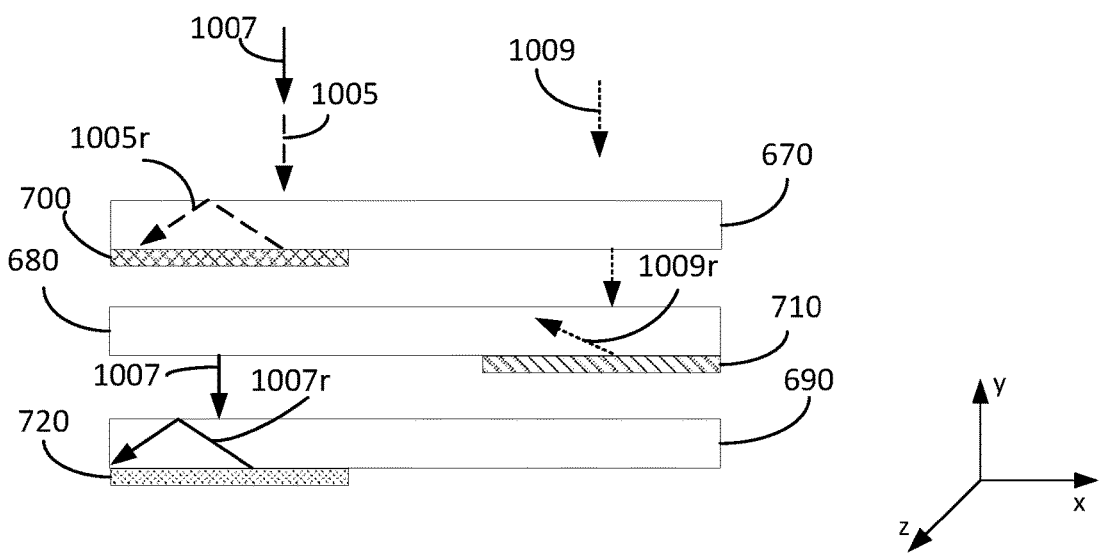
FIG. 10A illustrates a side view of the waveguide assembly illustrated in FIG. 10 along a plane 10A-10A.

FIG. 10A illustrates a side view of the waveguide assembly illustrated in FIG. 10 along a plane 10A-10A. As discussed above, the projector is configured to output a first and a second color image (e.g., red and blue color images) through a first pupil and a third color image (e.g., a green image) through a second pupil. In FIG. 10A, rays 1005 and 1007 represent the first and the second color image output from the first pupil and ray 1009 represents the third color image output from the second pupil. Referring to FIG. 10A, in-coupling optical element 700 is configured to in-couple the first color image (represented by ray 1005) into the waveguide 670 such that it propagates through the waveguide 670 by multiple total internal reflections at the major surfaces of the waveguide 670. In FIG. 10A, ray 1005r represents the propagation of the in-coupled light corresponding to the first color image. The in-coupling optical element 720 is configured to in-couple the second color image (represented by ray 1007) into the waveguide 690 such that it propagates through the waveguide 690 by multiple total internal reflections at the major surfaces of the waveguide 690. In FIG. 10A, ray 1007r represents the propagation of the in-coupled light corresponding to the second color image. As discussed above, the in-coupling optical element 700 associated with the waveguide 670 and the in-coupling optical element 720 associated with the waveguide 690 are vertically aligned (e.g., along the y-axis) with each other and spatially overlap with each other laterally (e.g., in the x-z plane).

In FIG. 10A, the in-coupling optical element 710 is configured to in-couple the third color image (represented by ray 1009) into the waveguide 680 such that it propagates through the waveguide 680 by multiple total internal reflections at the major surfaces of the waveguide 680. In FIG. 10A, ray 1009*r* represents the propagation of the in-coupled light corresponding to the third color image. The in-coupling optical element 710 is disposed to receive light output from the second pupil of the projector spatially separated from the first pupil. Accordingly, the in-coupling optical element 710 is laterally spaced apart from the in-coupling optical elements 700 and 720, as seen in a top-down view.

As discussed above, the in-coupling optical elements 700, 710 and 720 are configured to redirect incident light having a specific optical characteristic (e.g., a particular wavelength, a range of wavelengths and/or a particular state of polarization) such that it is in-coupled into the associated waveguide. For example, in various embodiments, in-coupling optical elements 700, 710 and 720 may comprise refractive, reflective and/or diffractive features that are configured to selectively refract, reflect and/or diffract light having a particular color (e.g., red, green or blue) such that most of incoming light having a particular color, or wavelength, is in-coupled into the associated waveguide. In such embodiments, most of the incoming light having a color that is not configured to be selectively refracted, reflected and/or diffracted by the in-coupling optical elements 700, 710 and 720 passes through the in-coupling optical elements 700, 710 and 720 without being in-coupled into the associated waveguide. In various embodiments, the in-coupling optical elements 700, 710 and 720 may comprise wavelength selective and/or polarization selective gratings. In embodiments of the in-coupling optical elements 700, 710 and 720 comprising polarization selective gratings, the light output from the first pupil corresponding to the first color image may have a first polarization state (e.g., linear, circular or elliptical polarization state) and the light output from the first pupil corresponding to the first color image may have a second polarization state (e.g., linear, circular or elliptical polarization state) different from the first polarization state. In embodiments of the in-coupling optical elements 700, 710 and 720 comprising wavelength selective gratings, light output from the first pupil corresponding to the first color image and the light output from the first pupil corresponding to the second color image may have the same polarization state. Without any loss of generality, in embodiments of the in-coupling optical elements 700, 710 and 720 comprising wavelength selective gratings, the gratings may be configured such that the coupling efficiency of the gratings to light having a particular wavelength is greater than the coupling efficiency of the gratings to light having wavelengths different from the particular wavelength. In such embodiments, although the coupling efficiency of the gratings to light having wavelengths different from the particular color may be reduced, in practice a small amount of light having wavelengths different from the particular color may be in-coupled into the associated waveguide. It will be appreciated that light of different wavelengths may correspond to different colors and, as such, references herein to light of different colors should also be understood to be references to light of different wavelengths.

Referring to FIG. 10A, the ray of light 1007 forming the second color image output from the first pupil of the projector is depicted as passing through the in-coupling optical element 700 without being in-coupled into the waveguide 670. Although, FIG. 10A depicts that all the incoming light corresponding to the first color image output from the first pupil of the projector is in-coupled into the waveguide 670, in practice some of the incoming light corresponding to the first color image output from the first pupil of the projector may be transmitted through the in-coupling optical element 700 and not be in-coupled into the waveguide 670. Similarly, although FIG. 10A depicts that all the incoming light corresponding to the second color image output from the first pupil of the projector is transmitted through the in-coupling optical element 700 without being redirected, in practice some of the incoming light corresponding to the second color image output from the first pupil of the projector may be in-coupled into the waveguide 670 by the in-coupling optical element 700. In the embodiment depicted in FIG. 10A, the in-coupling optical elements 700, 710 and 720 are disposed over the major surface (e.g., bottom major surface) of the waveguide that is opposite the major surface (e.g., upper major surface) that receives incident light from the projector. Accordingly, the in-coupling optical elements 700, 710 and 720 are configured to operate in the reflection mode. However, in other embodiments, the in-coupling optical elements 700, 710 and 720 may be disposed on the major surface (e.g., upper major surface) that receives incident light from the projector and configured to operate in transmission mode.

In the embodiments illustrated in FIG. 10A, the in-coupling optical elements 700, 710 and 720 are illustrated as being disposed on or adjacent to the bottom major surface. Accordingly, the in-coupling optical elements 700, 710 and 720 are configured to operate in a reflection mode. For example, one or more of the in-coupling optical elements 700, 710 and 720 can comprise reflective diffraction gratings to selectively in-couple light of particular wavelengths into a respective one of the waveguides 670, 680 and 690. For example, in the embodiment illustrated in FIG. 10A, the in-coupling optical element 700 is configured to reflect light (represented by ray 1005) forming the first color image into the waveguide 670 such that it propagates through the waveguide 670 by multiple total internal reflections; the in-coupling optical element 710 is configured to reflect light (represented by ray 1009) forming the third color image into the waveguide 680 such that it propagates through the waveguide 680 by multiple total internal reflections; and the in-coupling optical element 720 is configured to reflect light (represented by ray 1007) forming the second color image into the waveguide 690 such that it propagates through the waveguide 690 by multiple total internal reflections.

Additionally, in the embodiment illustrated in FIG. 10A, the in-coupling optical element 700 is also configured to pass most of the incident light forming the second color image (represented by ray 1007). For example, the in-coupling optical element 700 can be configured to pass more than 50% of the incident light forming the second color image (represented by ray 1007). As another example, the in-coupling optical element 700 can be configured to pass greater than or equal to about 60% of the incident light forming the second color image (represented by ray 1007), greater than or equal to about 75% of the incident light forming the second color image (represented by ray 1007), greater than or equal to about 80% of the incident light forming the second color image (represented by ray 1007), greater than or equal to about 85% of the incident light forming the second color image (represented by ray 1007), greater than or equal to about 90% of the incident light forming the second color image (represented by ray 1007), or greater than or equal to about 95% of the incident light forming the second color image (represented by ray 1007).

In various embodiments, one or more of the in-coupling optical elements 700, 710 and 720 can be configured to transmit most (e.g., greater than or equal to about 50%, greater than or equal to about 60%, greater than or equal to about 70%, greater than or equal to about 80%, greater than or equal to about 90%, greater than or equal to about 95%, or greater than or equal to about 99%) of the incident light having wavelengths that are not intended to be in-coupled by the respective in-coupling optical element into the associated waveguide while simultaneously reflecting most (e.g., greater than or equal to about 50%, greater than or equal to about 60%, greater than or equal to about 70%, greater than or equal to about 80%, greater than or equal to about 90%, greater than or equal to about 95%, or greater than or equal to about 99%) of the incident light having wavelengths that are intended to be in-coupled by the respective in-coupling optical element into the associated waveguide.

In various embodiments, the in-coupling optical element associated with the last waveguide in the stack (e.g., the in-coupling optical element 720 associated with waveguide 690) can be metallized. In addition, in some embodiments having two pupils, the in-coupling optical element for the last waveguide of each pupil may be metallized. It will be appreciated that the last waveguide is the waveguide which receives light last, after the light passes through all other waveguides. In a two-pupil arrangement, each pupil may have a last waveguide; for example, the last waveguide for the pupil of light rays 1009 is the waveguide 680. In addition, the last pupil for the pupil of light rays 1007 is the waveguide 690. As a result, in some embodiments, one or both of in-coupling optical element 710 and 720 may be metallized. Metallization may increase the efficiency of reflection and, thus, increase the light in-coupling efficiency. However, metalized reflective gratings can reduce the transmissivity of light having wavelengths that are not intended to be in-coupled by the respective in-coupling optical element into the associated waveguide. Accordingly, in-coupling optical elements for waveguides receiving light from the projector before the last waveguide are preferably non-metallized.

In various embodiments, one or more of the in-coupling optical elements 700, 710 and 720 can comprise transmissive diffractive gratings that are configured to redirect most (e.g., greater than or equal to about 50%, greater than or equal to about 60%, greater than or equal to about 70%, greater than or equal to about 80%, greater than or equal to about 90%, greater than or equal to about 95%, or greater than or equal to about 99%) of the incident light having wavelengths that are intended to be in-coupled by the respective in-coupling optical element into the associated waveguide at angles that would cause the redirected light to propagate through the associated waveguide by total internal reflection. At the same time, the one or more of the in-coupling optical elements 700, 710 and 720 comprising transmissive diffractive gratings are configured to transmit most (e.g., greater than or equal to about 50%, greater than or equal to about 60%, greater than or equal to about 70%, greater than or equal to about 80%, greater than or equal to about 90%, greater than or equal to about 95%, or greater than or equal to about 99%) of the incident light having wavelengths that are not intended to be in-coupled by the respective in-coupling optical element into the associated waveguide. In such embodiments, the one or more of the in-coupling optical elements 700, 710 and 720 comprising transmissive diffractive gratings are disposed on the upper major surface of the waveguide.

Figure 11:
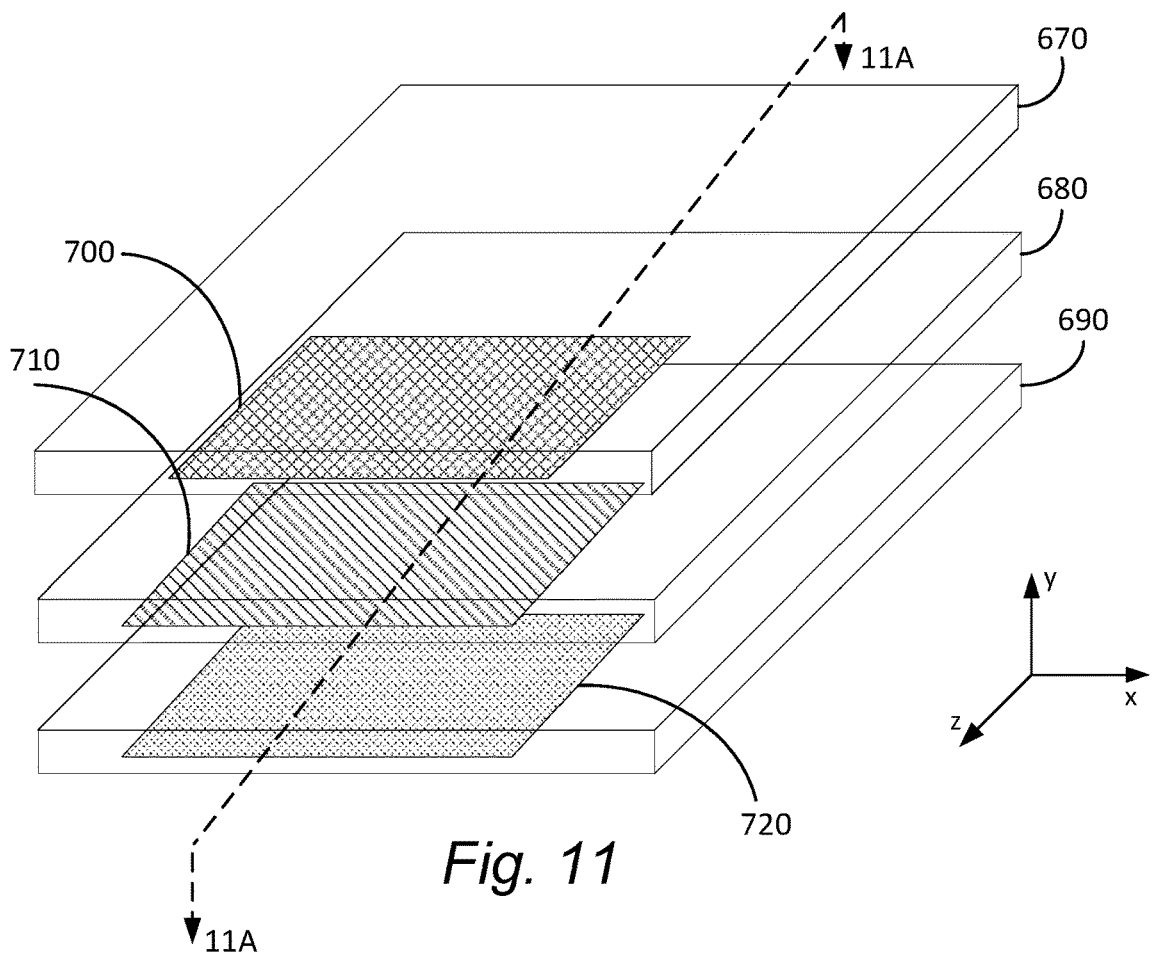
FIG. 11 schematically illustrates a perspective view of an example of a waveguide assembly comprising a plurality of waveguides stacked over each other and in-coupling optical elements configured to in-couple light output from a projector having a single pupil.

FIG. 11 schematically illustrates a perspective view of an example of a waveguide assembly comprising a plurality of waveguides stacked over each other. Each waveguide in the plurality of waveguides is associated with an in-coupling optical element configured in-couple light having a specific optical property (e.g., a particular wavelength, a range of wavelengths and/or a particular state of polarization). The illustrated embodiment comprises three waveguides 670, 680, and 690 stacked over each other. Each waveguide is associated with an in-coupling optical element (e.g., in-coupling optical elements 700, 710 and 720) that are configured to in-couple light having different wavelengths output from a projector. The projector may be configured to have a single-pupil from which a plurality of different color images (e.g., blue, green and red color images) are output. Accordingly, in the embodiment illustrated in FIG. 11, in-coupling optical elements 700, 710 and 720 are vertically aligned with each other (e.g., along the y-axis) such that they spatially overlap with each other laterally (e.g., in the x-z plane) and coincide with the single-pupil of the projector.

Figure 11A:
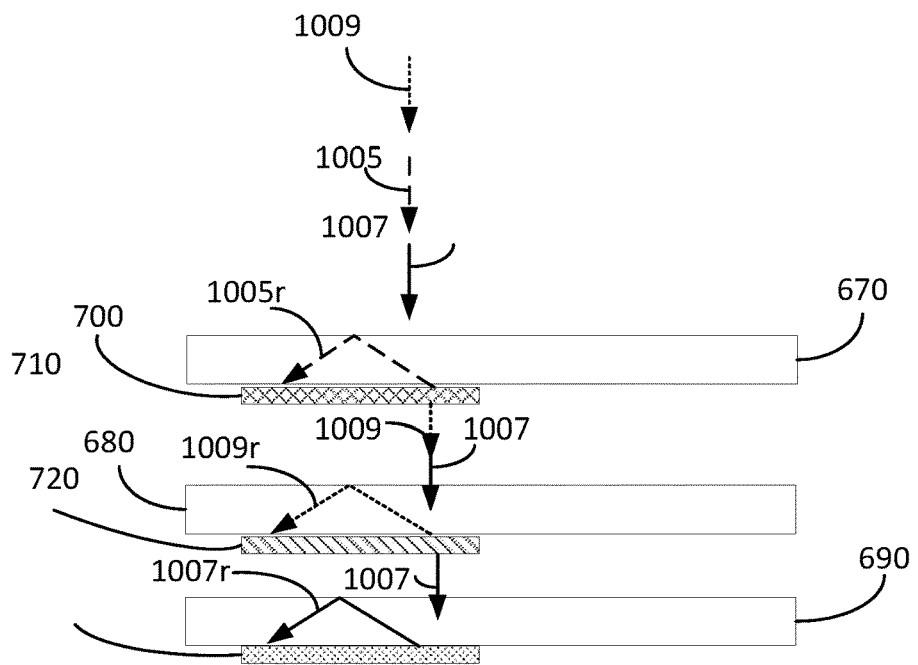
FIG. 11A illustrates a side view of the waveguide assembly illustrated in FIG. 11 along a plane 11A-11A.

FIG. 11A illustrates a side view of the waveguide assembly illustrated in FIG. 11 along an axis 11A-11A. As discussed above, the projector is configured to output a first color image, a second color image, and a third color image (e.g., red, green and blue color images) through the single-pupil. In FIG. 11A, rays 1005, 1007 and 1009 represent the first, the second, and the third color image output from the single-pupil. Referring to FIG. 11A, in-coupling optical element 700 is configured to in-couple the first color image (represented by ray 1005) into the waveguide 670 such that it propagates through the waveguide 670 by multiple total internal reflections at the upper and bottom major surfaces of the waveguide 670, the in-coupling optical element 720 is configured to in-couple the second color image (represented by ray 1007) into the waveguide 690 such that it propagates through the waveguide 670 by multiple total internal reflections at the upper and bottom major surfaces of the waveguide 670 and the in-coupling optical element 710 is configured to in-couple the third color image (represented by ray 1009) into the waveguide 680 such that it propagates through the waveguide 670 by multiple total internal reflections at the upper and bottom major surfaces of the waveguide 670. As discussed above, the in-coupling optical element 700 is configured to in-couple most of the incident light corresponding to the first color image and allow most of the incident light corresponding to the second and third color images to pass through without being redirected. Similarly, the in-coupling optical element 710 is configured to in-couple most of the incident light corresponding to the third color image and allow most of the incident light corresponding to the second color image to pass through without being redirected.

In the above embodiments, it is desirable that the in-coupling optical element 700 in-couple all (or most of) the incident light corresponding to the first color image into the associated waveguide 670 while allowing all (or most of) the incident light corresponding to the second color image and the third color image to be transmitted without being in-coupled. Similarly, it is desirable that the in-coupling optical element 710 in-couple all (or most of) the incident light corresponding to the third color image into the associated waveguide 680 while allowing all (or most of) the incident light corresponding to the second color image to be transmitted without being in-coupled. However, in practice, some of the incident light corresponding to the second color image and the third color image may be in-coupled into the associated waveguide 670 by the in-coupling optical element 700 and some of the incident light corresponding to the second color image and the third color image may be in-coupled into the associated waveguide 680 by the in-coupling optical element 710. Furthermore, some of the incident light corresponding to the first color image may be transmitted through the in-coupling optical element 700 and in-coupled into waveguides 680 and/or 690.

In-coupling of a color image into an unintended waveguide may cause undesirable optical effects, such as, for example cross-talk and/or ghosting. For example, in-coupling of the first color image into the unintended waveguide 680 and/or 690 may result in undesirable cross-talk between the first color image, the second color image and/or the third color image and/or cause undesirable ghosting. As another example, in-coupling of the second or third color image into the unintended waveguide 670 may result in undesirable cross-talk between the first color image, the second color image and/or the third color image and/or cause undesirable ghosting. These undesirable optical effects may be mitigated by providing optical devices (e.g., absorption filters) that may reduce the amount of incident light that is in-coupled into an unintended waveguide.

Figure 12:
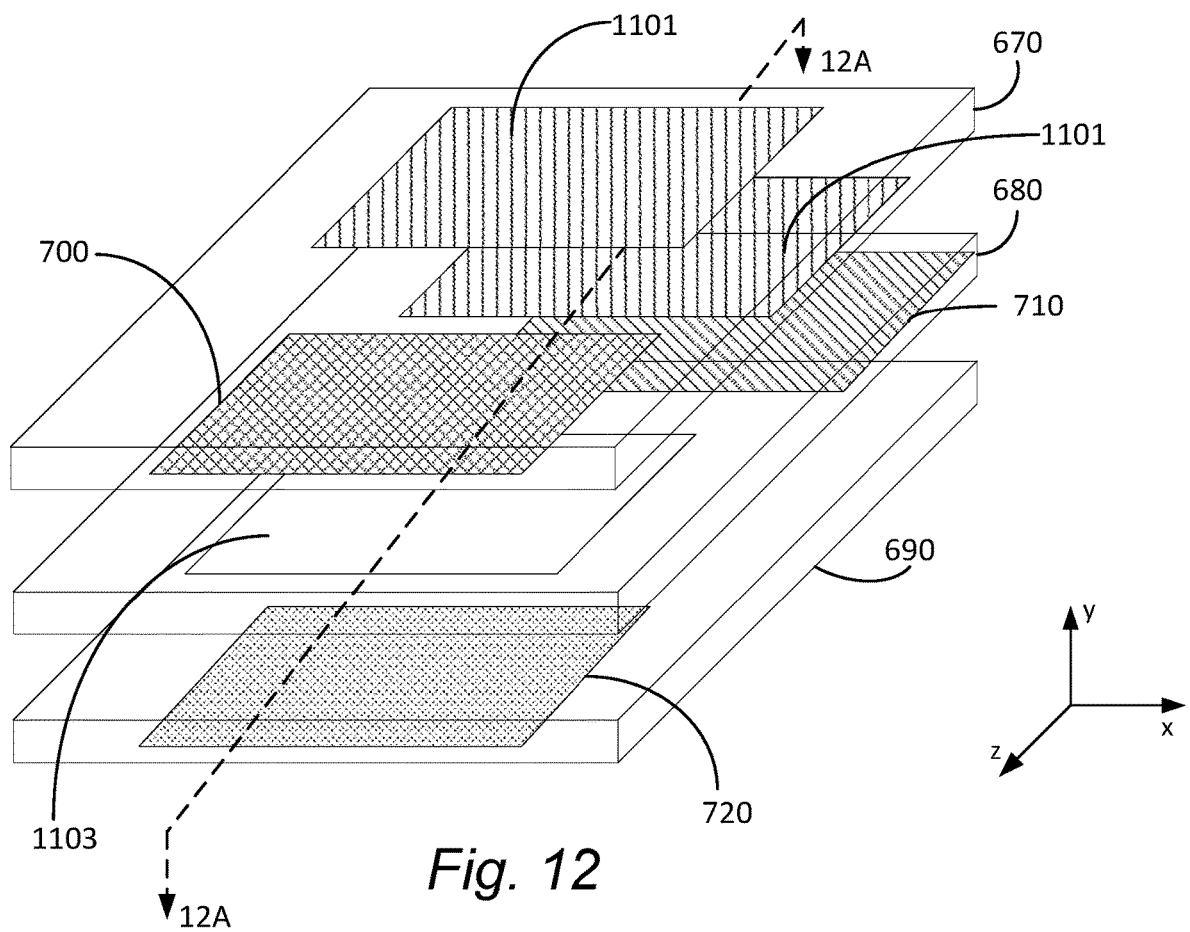
FIG. 12 schematically illustrates a perspective view of an example of a split-pupil waveguide assembly comprising a plurality of waveguides stacked over each other, in-coupling optical elements configured to in-couple light output from a projector having two spatially-separated pupils, and a plurality of color/wavelength filters.
Figure 12A:
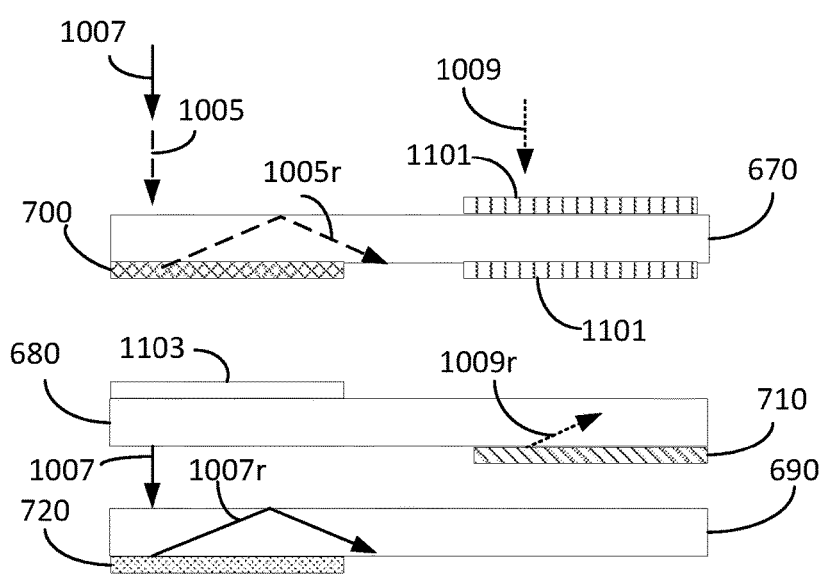
FIG. 12A schematically illustrates a side-view of the example illustrated in FIG. 12.

FIGS. 12, 12A, 13 and 13A illustrate implementations of waveguide assemblies comprising one or more optical filters. FIG. 12 and FIG. 12A illustrate a perspective view and a side view respectively of a waveguide assembly comprising three waveguides 670, 680, and 690 stacked over each other that are configured to receive light corresponding to a first color image and a second color image from a first pupil of a projector and receive a third color image from a second pupil of the projector spatially separated from the first pupil. In FIG. 12A, light corresponding to the first color image represented by ray 1005 is intended to be in-coupled into the waveguide 670 by the in-coupling optical element 700 and the light corresponding to the second color image represented by ray 1007 is intended to be in-coupled into the waveguide 690 by the in-coupling optical element 720. The waveguide assembly illustrated in FIG. 12A comprises a plurality of optical filters 1101 and 1103 that are configured to reduce the amount of incident light corresponding to the second color image (represented by ray 1007) that is in-coupled into the waveguide 670 and reduce the amount of incident light corresponding to the first color image (represented by ray 1005) that is in-coupled into the waveguide 690. A plurality of optical filters 1101 disposed on the upper and bottom major surfaces of the waveguide 670 are configured to absorb light corresponding to the second color image (e.g., red color) that is in-coupled into waveguide 670. The plurality of optical filters 1101 may be configured as absorption filters that absorb in-coupled light corresponding to the second color image (e.g., red color) that propagates through the waveguide 670 by total internal reflection. The plurality of optical filters 1101 may be configured to not affect the propagation of the in-coupled light corresponding to the first color that propagates via TIR through the waveguide 670. Accordingly, the plurality of optical filters 1101 may be configured to be substantially transmissive to the in-coupled light corresponding to the first color that propagates via TIR through the waveguide 670. Accordingly, the plurality of optical filters 1101 can be considered as a selectively transparent optical component that is substantially transparent to light of certain colors.

Another optical filter 1103 configured to absorb incident light corresponding to the first color image that is not in-coupled into the waveguide and is transmitted through the in-coupling optical element 700 may be disposed between the waveguide 670 and 690. The optical filter 1103 may be substantially transmissive to light of the second and the third color such that incident light corresponding to the second color image and/or the third color image is transmitted through the optical filter 1103 with little to no attenuation. As such, the optical filter 1103 can be considered as a selectively transparent optical component that is substantially transparent to light of the second and the third color. The optical filter 1103 may be disposed on a major surface. In some embodiments, the optical filter 1103 can be disposed on the upper major surface of the waveguide 680 as shown in FIG. 12A. For example, the optical filter 1103 may be disposed on a portion of the upper major surface of the waveguide 680 that is laterally spaced apart from the in-coupling optical element 710 and vertically aligned with the first pupil of the projector. In some embodiments, the optical filter 1103 may be disposed on a bottom major surface of the waveguide 680 or on an upper major surface of the waveguide 690. For example, the optical filter may be disposed on the upper major surface of the waveguide 690 that is configured to receive incident light corresponding to the second color image. In some other embodiments, the optical filter 1103 may be disposed on a separate substrate disposed between the waveguides 670 and 690.

Referring to FIG. 12A, the optical filter 1101 may be disposed over a portion of the upper and/or bottom major surfaces of the waveguide 670. For example, the optical filter 1101 may be disposed over a portion of the upper major surface of the waveguide 670 that is laterally spaced apart from the in-coupling optical element 700. In some embodiments, the optical filter 1101 may have a single-pass attenuation factor less than or equal to about 10% (e.g., less than or equal to about 5%, less than or equal to about 2%, less than or equal to about 1%) such that most (e.g., greater than or equal to about 50%, greater than or equal to about 60%, greater than or equal to about 70%, greater than or equal to about 80%, greater than or equal to about 90%, greater than or equal to about 95%) of the light of the second color that is not propagating via TIR in the waveguide 670 and which is incident on the optical filter 1101 from the ambient is transmitted through the optical filter 1101. Some such embodiments of the optical filter 1101 having a single-pass attenuation factor less than or equal to about 10% (e.g., less than or equal to about 5%, less than or equal to about 2%, less than or equal to about 1%) may be disposed over a majority of the area of the upper major surface (e.g., the surface that receives incident light from the projector) of the waveguide 670 without significantly reducing the amount of incident light of first color image that is in-coupled into the waveguide 670. Waveguide assemblies comprising some such embodiments of the optical filter 1101 having a single-pass attenuation factor less than or equal to about 10% may also be incorporated in the wearable display system 60 described above, to allow most of the light coming from the world 510 to be transmitted to the user. Accordingly, embodiments of the optical filter 1101 having a single-pass attenuation factor less than or equal to about 10% may be disposed in the field of view of the user. Some other embodiments of the optical filter 1101 may have high single-pass attenuation factor. Such embodiments of the optical filter 1101 may be disposed in a portion of the waveguide 670 that is outside the field of view of the user.

Referring to FIG. 12A, the optical filter 1103 may be configured to have high single-pass attenuation factor for light having the first color and low single pass attenuation factor for light having the second color. For example, the optical filter 1103 may be configured to transmit greater than about 90% of incident light having the second color (e.g., red color) and absorb greater than about 90% of incident light having the first color (e.g., blue color).

Figure 13:
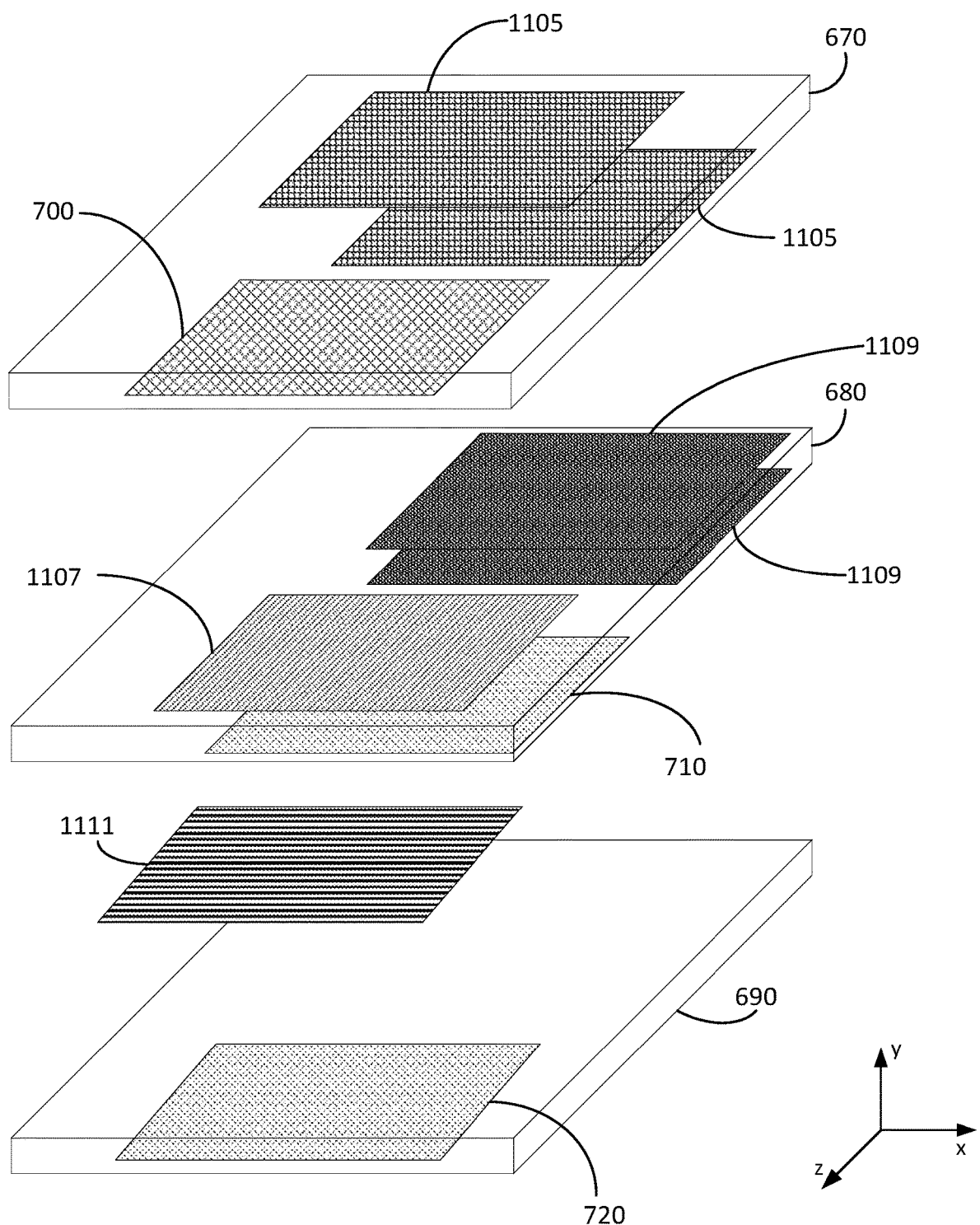
FIG. 13 schematically illustrates a perspective view of an example of a single-pupil waveguide assembly comprising a plurality of waveguides stacked over each other, in-coupling optical elements configured to in-couple light from a projector having a single-pupil, and a plurality of color/wavelength filters.
Figure 13A:
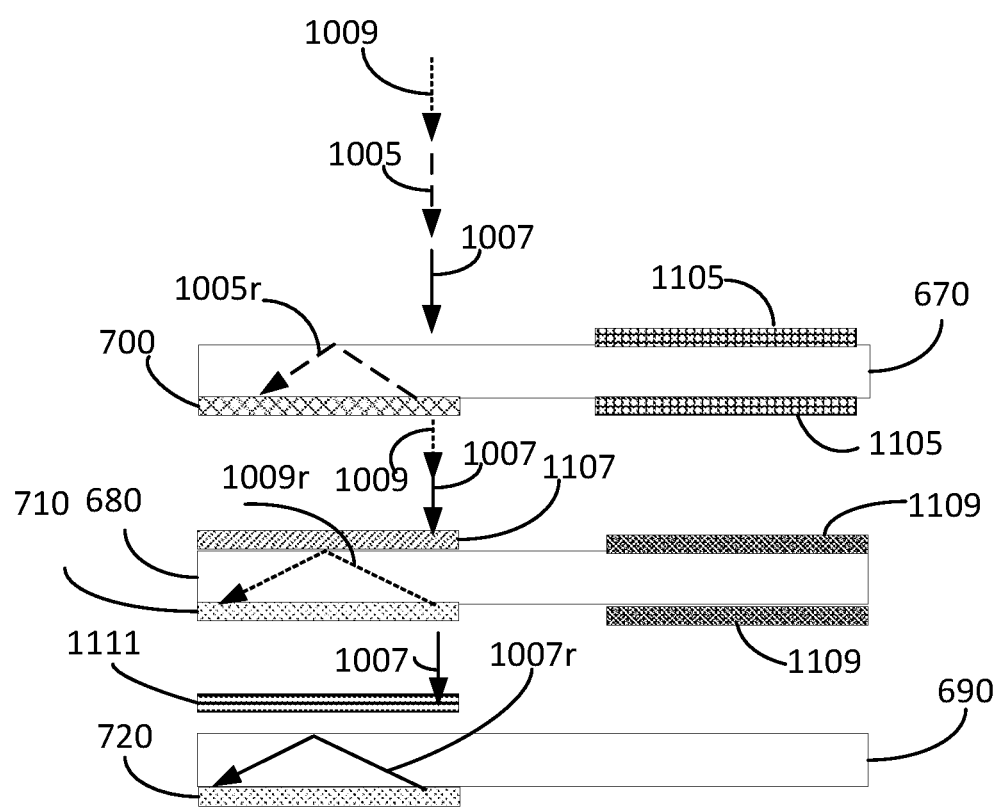
FIG. 13A illustrates a side-view of the example illustrated in FIG. 13.

FIG. 13 and FIG. 13A illustrate a perspective view and a side view respectively of a waveguide assembly comprising three waveguides 670, 680, and 690 stacked over each other that are configured to receive light corresponding to a first color image, light corresponding to a second color image, and light corresponding to a third color image from a single-pupil of a projector. The waveguide assembly illustrated in FIG. 13A comprises a plurality of optical filters 1105, 1107 and 1109 that are configured to reduce the amount of incident light corresponding to the second and third color images (represented by rays 1007 and 1009) that is in-coupled within or propagates into the waveguide 670, reduce the amount of incident light corresponding to the first and second color images (represented by rays 1005 and 1007) that is in-coupled into or propagates within the waveguide 680, and reduce the amount of incident light corresponding to the first and third color images (represented by rays 1005 and 1009) that is in-coupled into the waveguide 690.

For example, a plurality of optical filters 1105 disposed on the upper and bottom major surfaces of the waveguide 670 are configured to absorb light corresponding to the second and third color images (e.g., red color and green color) that is in-coupled into waveguide 670. An optical filter 1107 disposed between the waveguides 670 and 680 is configured to absorb most (e.g., greater than or equal to about 90%, greater than or equal to about 95%, or greater than or equal to about 99%) of the light corresponding to the first color image (e.g., blue color image) that is transmitted through the in-coupling optical element 700. A plurality of optical filters 1109 disposed on the upper and bottom major surfaces of the waveguide 680 are configured to absorb light corresponding to the second color image (e.g., red color) and light corresponding to the first color image (e.g., blue color) that is in-coupled into waveguide 680. An optical filter 1111 disposed between the waveguides 680 and 690 is configured to absorb a portion of light corresponding to the third color image (e.g., green color image) that is transmitted through the in-coupling optical element 710.

As discussed above, the plurality of optical filters 1105 may be configured as absorption filters that absorb in-coupled light corresponding to the second and third color image (e.g., red color and green color) that propagates through the waveguide 670 by total internal reflection without affecting the propagation of the in-coupled light corresponding to the first color that propagates via TIR through the waveguide 670. Similarly, the plurality of optical filters 1109 may be configured as absorption filters that absorb in-coupled light corresponding to the second color image (e.g., red color) that propagates through the waveguide 680 by total internal reflection without affecting the propagation of the in-coupled light corresponding to the third color that propagates via TIR through the waveguide 680.

The optical filters 1107 and 1111 may also be configured as absorption filters. The optical filter 1107 may be substantially transmissive to light of the second and the third color such that incident light corresponding to the second color image and/or the third color image is transmitted through the optical filter 1107 with little to no attenuation. The optical filter 1111 may be substantially transmissive to light of the second color such that incident light corresponding to the second color image is transmitted through the optical filter 11111 with little to no attenuation. As such, the optical filters 1107 and 1111 can be considered as selectively transparent optical components that are transparent to light of certain colors. The optical filter 1107 may be disposed on a major surface (e.g., upper major surface) of the waveguide 680 as shown in FIG. 13A. Alternately, the optical filter 1107 may be disposed on a separate substrate positioned between the waveguides 670 and 680 or on the bottom major surface of the waveguide 670. The optical filter 1111 may be disposed on a major surface (e.g., upper major surface) of the waveguide 690. Alternately, the optical filter 1111 may be disposed on a separate substrate positioned between the waveguides 680 and 690 or on the bottom major surface of the waveguide 680. Without any loss of generality, the optical filters 1107 and 1111 may be vertically aligned with the single-pupil of the projector that outputs light corresponding to the first, second and third color images.

Various embodiments of the optical filters 1105 and 1109 may have a single-pass attenuation factor less than about 10%. Various embodiments of the optical filters 1107 and 1111 may be configured to have low attenuation factor for the wavelengths that are to be transmitted and high attenuation factor for the wavelengths that are to be absorbed. For example, the optical filter 1107 may be configured to transmit greater than about 90% of incident light having the second and third color (e.g., red color and green color) and absorb greater than 90% of incident light having the first color (e.g., blue color). Similarly, the optical filter 1111 may be configured to transmit greater than about 90% of incident light having the second color (e.g., red color) and absorb greater than 90% of incident light having the third color (e.g., green color). The optical filters 1101, 1103, 1105, 1107, 1109 and 1111 described above may comprise a layer of color selective absorbing material deposited on a substrate (e.g., a glass substrate, a polymer substrate, a crystalline substrate, one or both surfaces of the waveguide 670, 680 and/or 690, etc.). The color selective absorbing material may comprise a dye, an ink, or other light absorbing material.

The color selective material may be deposited on the substrate using various deposition methods. For example, the color selective absorbing material may be deposited on the substrate using jet deposition technology (e.g., ink-jet deposition). Ink-jet deposition may facilitate depositing thin layers of the color selective absorbing material. Using ink-jet deposition, the thickness of the layers of the color selective absorbing material may be controlled. For example, the layer of the color selective absorbing material deposited using ink-jet deposition may have a thickness between about 10 nm and about 1 micron (e.g., between about 10 nm and about 50 nm, between about 25 nm and about 75 nm, between about 40 nm and about 100 nm, between about 80 nm and about 300 nm, between about 200 nm and about 500 nm, between about 400 nm and about 800 nm, between about 500 nm and about 1 micron, or any value in a range/sub-range defined by any of these values). Controlling the thickness of the deposited layer of the color selective absorbing material may be advantageous in achieving an optical filter having a desired attenuation factor. Furthermore, ink-jet deposition may facilitate deposition of a layer of the color selective absorbing material having uniform thickness. Ink-jet deposition may also advantageously reduce the amount of color selective absorbing material that is wasted during deposition. Additionally, different compositions of the color selective absorbing material may be deposited in different portions of the substrate using ink-jet deposition. Furthermore, layers having different thickness may be deposited in different portions of the substrate. Such variations in composition and/or thickness may advantageously allowing for location variations in absorption. For example, in areas of a waveguide in which transmission of light from the ambient (to allow the viewer to see the ambient environment) is not necessary, the composition and/or thickness may be selected to provide high absorption or attenuation of light. Other deposition methods such as coating, spin-coating, spraying, etc. may be employed to deposit the color selective absorbing material on the substrate.

The size (e.g., the shape and area) of the light beam that is to be absorbed by the corresponding optical filter is preferably substantially equal to the size of the optical filter 1103, 1107 and 1111 described above (FIGS. 12A, 13A, and 13A, respectively). For example, the sizes of the optical filter 1103 and the light beam 1005 are preferably substantially equal, with the light beam 1005 forming the first color image that is configured to be absorbed by the optical filter 1103. Similarly, the sizes of the optical filter 1107 and the light beam 1005 forming the first color image that is configured to be absorbed by the optical filter 1107 and the size of the optical filter 1111 can be equal to the size of the light beam 1009 forming the third color image that is configured to be absorbed by the optical filter 1111. Without any loss of generality, in embodiments of display devices in which the size of the optical filter is comparable to the size of the incident light beam that is configured to be absorbed, the optical filter can be vertically aligned with the exit pupil of the projector that emits the incident light beam that is configured to be absorbed.

However, in various embodiments, it may not be practical to manufacture optical filters that have a size equal to the size of the light beam to be absorbed. In some such embodiments, the size of the optical filter 1103, 1107 and 1111 can be configured to be smaller than the size of the corresponding light beam to be absorbed. In some such embodiments, comprising an optical filter having a size smaller than the size of the corresponding light beam to be absorbed, the position of the optical filter can be laterally displaced with respect to the exit pupil of the projector that emits the incident light beam that is configured to be absorbed such that those incident angles that contribute more to the degradation of the image quality are absorbed as compared to other incident angles.

In the embodiments illustrated in FIGS. 12, 12A, 13 and 13A, the need for one or more optical filters 1101, 1103, 1105, 1107, 1109 and 1111 may be eliminated if one or more in-coupling optical elements 700, 710 and 720 have sufficiently high color selectivity for the color of the light that is intended to be in-coupled into the associated waveguide.

Other methods of reducing in-coupling of light having a particular color into an unintended waveguide may be used instead of or in addition to employing optical filters. For example, consider a display system comprising a projector that outputs light corresponding to two different color images (e.g., red color image and blue color image) from a single-pupil or two pupils displaced with respect to each other.

Figure 14A:
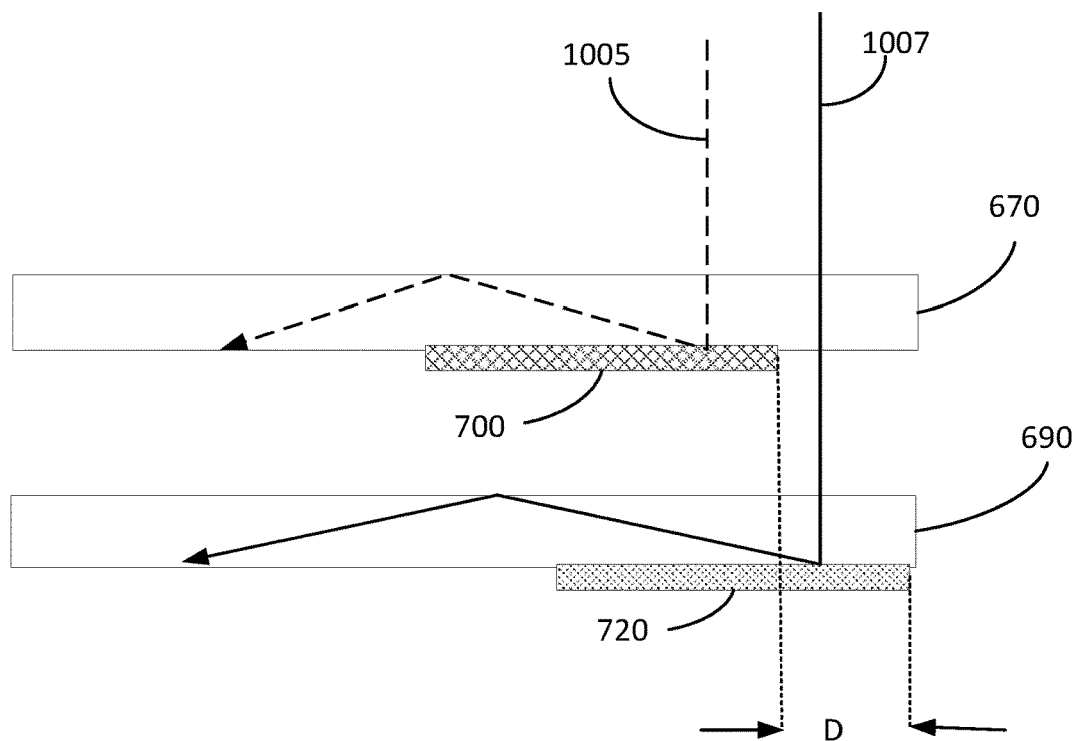
FIGS. 14A and 14B schematically illustrate a side-view of an example of a waveguide assembly comprising a plurality of waveguides stacked over each other and in-coupling optical elements configured to in-couple light of two different wavelengths, the in-coupling optical elements displaced with respect to each other to improve color selectivity.
Figure 14B:
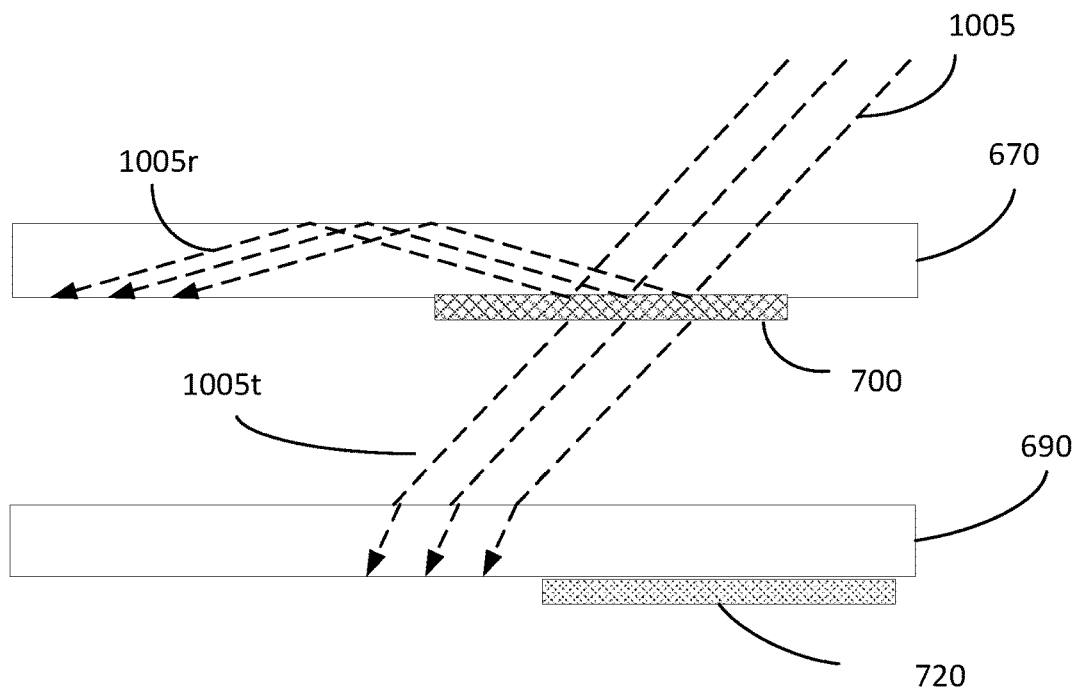

The display system further comprises a waveguide assembly comprising a first waveguide 670 having a first in-coupling optical element 700 that is configured to in-couple light corresponding to the first color image (e.g., blue color image) and a second waveguide 690 having a second in-coupling optical element 720 that is configured to in-couple light corresponding to the second color image (e.g., red color image). Such a waveguide assembly is illustrated in FIG. 14A-14B. In various embodiments of a display system comprising a projector that outputs light corresponding to two different component color images (e.g., red color image and blue color image) from two pupils displaced with respect to each other, the first in-coupling optical element 700 and the second in-coupling optical element 720 can be vertically aligned with the respective pupils that emit light corresponding to the image to be in-coupled into the respective waveguides. Accordingly, in such embodiments, the first in-coupling optical element 700 and the second in-coupling optical element 720 are also displaced with each other (e.g., by a distance 'D' as shown in FIG. 14A). It will be appreciated that one or more additional waveguides for in-coupling and out-coupling light for one or more additional component color images may be provided, such that the component color images together form a full color image, as discussed herein.

In various embodiments of a display system comprising a projector that outputs light corresponding to two different color images (e.g., red color image and blue color image) from a single pupil, the first in-coupling optical element 700 and the second in-coupling optical element 720 may be vertically aligned with the single-pupil of the projector that outputs light corresponding to the first and the second color images. However, the first in-coupling optical element 700 and the second in-coupling optical element 720 may be laterally displaced with respect to each other by a distance 'D' as shown in FIG. 14A. Laterally displacing the first in-coupling optical element 700 and the second in-coupling optical element 720 with respect to each other may advantageously reduce the coupling of light into an unintended waveguide, which may enhance color selectivity, reduce cross-talk and/or ghosting.

Laterally displacing the in-coupling optical element 720 with respect to the in-coupling optical element 700 may also be advantageous when light outputted from the single-pupil of the projector is incident at an angle on the waveguide assembly as shown in FIG. 14B. In this configuration, for some incident angles, the portion of light corresponding to the first color image that is transmitted through the in-coupling optical element 700 is not incident on the in-coupling optical element 720 and is accordingly not in-coupled into the waveguide 690.

Figure 15A:
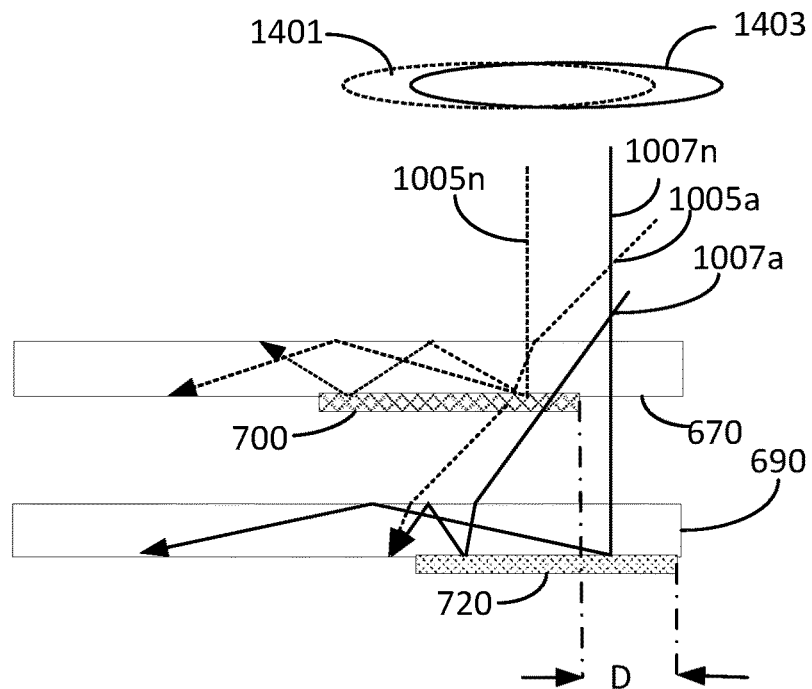
FIG. 15A schematically illustrates a side-view of an example of a waveguide assembly comprising a plurality of waveguides stacked over each other and in-coupling optical elements configured to in-couple light of two different wavelengths, the in-coupling optical elements laterally displaced with respect to each other to improve color selectivity.

Certain details related to laterally shifting in-coupling optical elements will now be discussed. With reference to FIG. 15A, a display system comprising a projector may output light corresponding to two different color images (e.g., a red color image represented by ray of light 1007n and 1007a, and blue color image represented by rays of light 1005n and 1005a). In some other embodiments, the light beams corresponding to the two different color images (e.g., red color image and blue color image) may be emitted from two different pupils, such as, for example, pupil 1401 and pupil 1403 shown in FIG. 14. In some embodiments, the two pupils emitting light beams corresponding to the two different color images (e.g., red color image and blue color image) may be at least partially overlapping as shown in FIG. 14. However, in some other embodiments, the two pupils such as, for example, pupil 1401 and pupil 1403, emitting light beams corresponding to the two different color images (e.g., red color image and blue color image) may spatially non-overlapping. In some other embodiments, the two pupils such as, for example, pupil 1401 and pupil 1403, emitting light beams corresponding to the two different color images (e.g., red color image and blue color image) may be completely overlapping such that the light beams corresponding to the two different color images (e.g., red color image and blue color image) may be considered to be emitted from a single exit-pupil. A single exit-pupil system may be particularly advantageous since light directed to the in-coupling optical elements may be pass through similar portions (e.g., the center) of projection optics, thereby reducing possible distortions that may occur if the light passed through different portions of the projection optics. In addition, a single exit-pupil system may advantageously require a smaller projection lens system than the multi exit-pupil system.

The display system further comprises a waveguide assembly comprising a first waveguide 670 having a first in-coupling optical element 700 that is configured to in-couple light corresponding to the first color image (e.g., blue color image) represented by rays of light 1005n and 1005a and a second waveguide 690 having a second in-coupling optical element 720 that is configured to in-couple light corresponding to the second color image (e.g., red color image) represented by rays of light 1007n and 1007a. Such a waveguide assembly is illustrated in FIG. 15A. The first in-coupling optical element 700 is vertically aligned with the first pupil 1401 of the projector that emits light corresponding to the first color image represented by rays of light 1005n and 1005a and the second in-coupling optical element 720 respective pupils is vertically aligned with the second pupil 1403 of the projector that light corresponding to the first color image represented by rays of light 1007n and 1007a. The first in-coupling optical element 700 and the second in-coupling optical element 720 are laterally displaced with respect to each other by a distance 'D' as shown in FIG. 15A. Laterally displacing the first in-coupling optical element 700 and the second in-coupling optical element 720 with respect to each other may advantageously reduce the coupling of light into an unintended waveguide, which may enhance color selectivity, reduce cross-talk and/or ghosting, as discussed herein. As discussed herein, the pupils 1401 and 1403 may partially overlap and, in some embodiments, preferably are the same single pupil of a projection system directing light to the first and second in-coupling optical elements 700 and 720.

Without being bound by theory, the beam of light emitted from a pupil of a projector is cone shaped and comprises rays of light that are incident normally on the surface of the waveguide, such as for example, rays 1005n and 1007n, and also rays that are incident at an angle with respect to the normal to the surface of the waveguide, such as, for example, rays 1005a and 1007a. Some of the light first color image may propagate pass the first in-coupling optical element, to impinge on the second in-coupling optical element 720. Laterally displacing the first in-coupling optical element 700 and the second in-coupling optical element 720 with respect to each other may reduce the amount of light corresponding to the first color image that is in-coupled into the second waveguide 690 and/or the amount of light corresponding to the second color image that is in-coupled into the first waveguide 670.

For example, by laterally displacing the first in-coupling optical element 700 and the second in-coupling optical element 720 with respect to each other, some of the light corresponding to the first color image that are incident obliquely with respect to the normal to the surface of the second waveguide 690 are not in-coupled into the second waveguide 690 since they are not incident on the second in-coupling optical element 720 as shown in FIG. 15A.

For example, consider that some portion of the light corresponding to the first color image is in-coupled into the second waveguide 690. The in-coupled portion of the light corresponding to the first color image may produce partial images when it is subsequently output from the waveguide 690. These partial images may degrade the contrast ratio and/or resolution of the first color image output from the first waveguide 670 and/or cause ghosting (by providing a ghost of the first color image output from the first waveguide 670). By reducing the amount of obliquely incident light corresponding to the first color image that is in-coupled into the second waveguide 690, as shown in FIG. 15A, may reduce or mitigate the degradation of the contrast ratio and/or resolution of the first color image output from the first waveguide 670 and/or reduce the amount of ghosting in the first color image output from the first waveguide 670.

Figure 15B:
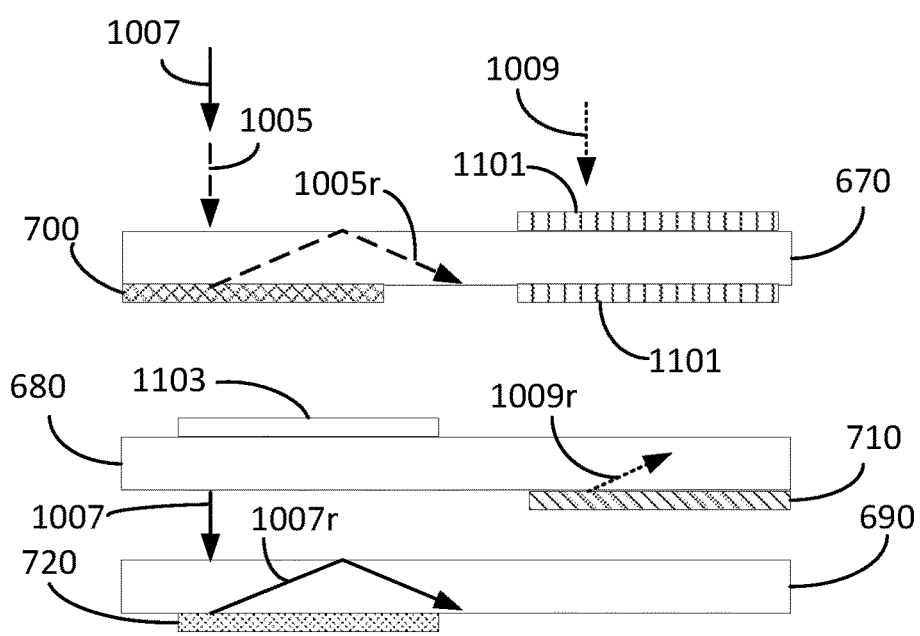
FIG. 15B schematically illustrates a side-view of an example of a waveguide assembly similar to that of FIG. 12A, and with laterally displaced in-coupling optical elements.

Some embodiments of display devices in which the first in-coupling optical element 700 and the second in-coupling optical element 720 are laterally displaced with respect to each other may omit a color filter that is configured to absorb light having wavelengths that are not desired to be in-coupled into a respective one of the waveguides. However, some embodiments of display devices in which the first in-coupling optical element 700 and the second in-coupling optical element 720 are laterally displaced with respect to each other may also include one or more optical filters (e.g., optical filters similar to optical filter 1101 or optical filter 1103) that are configured to absorb light having wavelengths that are not desired to be in-coupled into a respective one of the waveguides. For example, as shown in FIG. 15B, in an arrangement otherwise identical to that of FIG. 12A, the second in-coupling optical element 720 and associate color filter 1103 may be laterally displaced relative to the first in-coupling optical element 700.

In the embodiment illustrated in FIG. 15A, the in-coupling optical element 720 is laterally displaced to the right of the in-coupling optical element 700. However, in other embodiments, the in-coupling optical element 720 may be laterally displaced to the left of the in-coupling optical element 700, or into or out of the page. The amount of lateral displacement between a pair of in-coupling optical elements and the direction of displacement (e.g., to the right or the left, and/or into or out of the page) of one in-coupling optical element with respect to another in-coupling optical element may depend on the overall image quality of the image projected out of the waveguides.

In some embodiments, the direction of displacement (e.g., to the right or the left, and/or into or out of the page) and the amount of lateral displacement between a pair of in-coupling optical elements may be selected to reduce the perceptibility of a ghost image relative to the intensity of the desired image projected out of the waveguide. For example, in some embodiments, the direction of displacement (e.g., to the right or the left, and/or into or out of the page) and the amount of lateral displacement between a pair of in-coupling optical elements may be selected to reduce the intensity of the ghost image to about $1/100^{th}$ of the intensity of the desired image projected out of the waveguide. As another example, in some embodiments, the direction of displacement (e.g., to the right or the left, and/or into or out of the page) and the amount of lateral displacement between a pair of in-coupling optical elements may be selected such that the ghost image cannot be perceived by an average human eye.

In some embodiments, the direction of displacement and the amount of lateral displacement between a pair of in-coupling optical elements may be selected to increase the brightness and/or contrast ratio of the desired image projected out of the waveguide. In some embodiments, the direction of displacement (e.g., to the right or the left, and/or into or out of the page) and the amount of lateral displacement between a pair of in-coupling optical elements may be selected to increase the resolution as perceived by an average human of the desired image projected out of the waveguide.

In some embodiments, the amount of lateral displacement between a pair of in-coupling optical elements may be greater than or equal to about 5% (e.g., greater than or equal to about 10%, greater than or equal to about 15%, greater than or equal to about 20%, greater than or equal to about 25%, greater than or equal to about 30%, greater than or equal to about 40%) of a width of one the first or second in-coupling optical elements such that an overall image quality of a desired image projected out of the waveguide is improved (e.g., such that the intensity of a ghost image from a waveguide with one of the in-coupling optical elements is less than or equal to about 1/100 of the intensity of a desired image projected out of the waveguide with the other of the in-coupling optical elements, and/or such that a brightness, a resolution and/or a contrast ratio of a desired image projected out of the waveguide of a first of the in-coupling optical elements is improved). In addition, in some embodiments, the amount of lateral displacement between the pair of in-coupling optical elements may be less than 50% (e.g., less than about 40%, less than about 30%, or less than about 20%) of a width of one the first or second in-coupling optical elements. Where the in-coupling optical elements have different widths, the relevant width for determining displacement is the shortest width, in some embodiments.

Without being bound by theory, displacing a pair of in-coupling optical elements such that there is no overlap is desirable from a point of view of improving the overall image quality of the desired image projected out of the waveguide. However, displacing a pair of in-coupling optical elements with respect to each such that there is no overlap would require displacing the corresponding exit pupils of the projector that emit the light to be in-coupled by respective one of the pair of in-coupling optical elements such that exit pupils do not overlap. This may result in increasing the size of the projector and/or create optical artifacts which is undesirable. Displacing a pair of in-coupling optical elements and the corresponding exit pupils of the projector such that they partially overlap may be useful to reduce the size of the projector and/or reduce optical facts without negatively affecting the image quality of the desired image projected out of the waveguide. In some embodiments, the amount of lateral displacement is selected to be sufficiently small that a single exit-pupil projection system may be utilized to direct image light to the in-company optical elements, while the amount of displacement advantageously reduces the occurrence of ghost images from underlying waveguides. Such displacement may cause a portion of an image to not be displayed, since displacement of an in-coupling optical element may cause a portion of that in-coupling optical element to not receive light that it otherwise would receive if perfectly aligned the exit pupil and other in-coupling optical elements. Without being limited by theory, however, it is believed that the potential loss of a portion of an image has a smaller impact on image quality than ghost images that may originate from underlying waveguides which unintentionally in-couple and out-couple light intended for overlying waveguides. It will be appreciated that, with reference to an image light stream outputted by a projection system, the underlying waveguides are downstream of overlying waveguides.

In some embodiments, the direction of displacement (e.g., to the right or the left, and/or into or out of the page) and the amount of lateral displacement between a pair of in-coupling optical elements may be determined using a simulation tool that includes a virtual model of the display device including the waveguide stacks and the in-coupling optical elements. The direction of displacement (e.g., to the right or the left, and/or into or out of the page) and the amount of lateral displacement between a pair of in-coupling optical elements may be iteratively adjusted using the simulation tool to improve the overall image quality of the desired image that is projected out of the waveguide. For example, the direction of displacement and the amount of lateral displacement between a pair of in-coupling optical elements may be iteratively adjusted using the simulation tool to reduce the intensity of a ghost image relative to the intensity of the desired image that is projected out of the waveguide. As another example, the direction of displacement and the amount of lateral displacement between a pair of in-coupling optical elements may be iteratively adjusted using the simulation tool to improve at least one of a brightness, a contrast ratio and/or a resolution as perceived by an average human eye of the desired image that is projected out of the waveguide.

Figure 16:
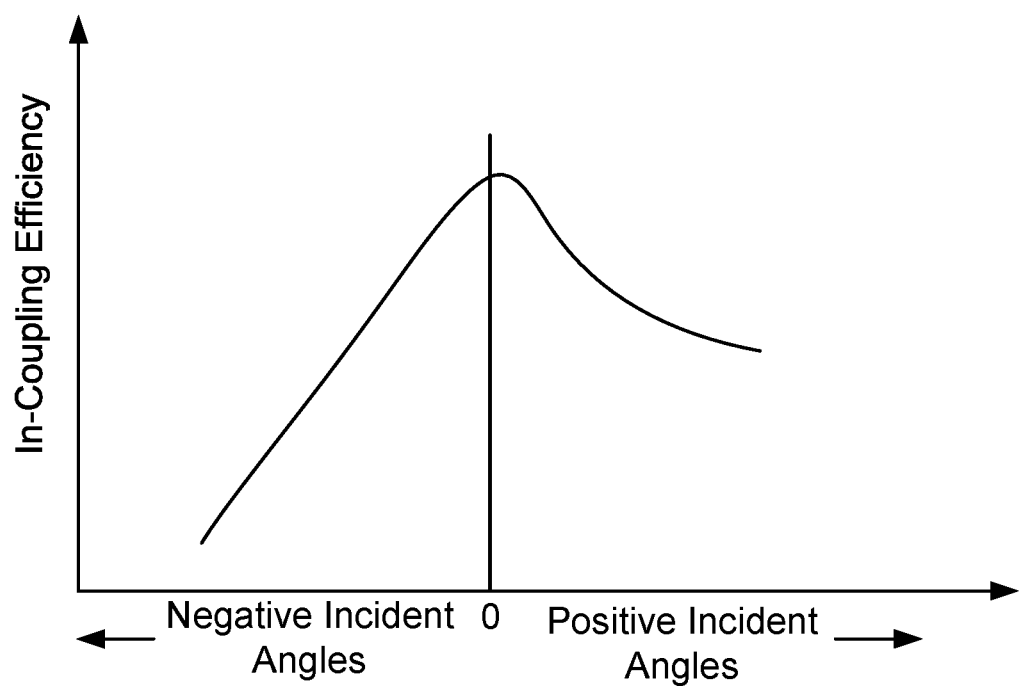
FIG. 16 schematically illustrates the variation of in-coupling efficiency of an in-coupling optical element for positive and negative incident angles.

In addition to displacing an in-coupling optical element with respect to another in-coupling optical element, one or more parameters of the individual elements (e.g., grating elements) of the in-coupling optical elements may be adjusted to vary the in-coupling efficiency of different colors of light incident at different angles. For example, without subscribing to any particular theory, light incident at negative incident angles (e.g., incident from a direction to the right of a normal to the surface) may be in-coupled with less efficiency as compared to light incident at positive incident angles (e.g., incident from a direction to the left of a normal to the surface) as shown in FIG. 16. Accordingly, the direction of displacement of one in-coupling optical element may be adjusted by taking into account the efficiency of in-coupling light incident at negative incident angles and positive incident angles. As another example, without subscribing to any particular theory the in-coupling efficiency of an in-coupling optical element to light incident at different angles of incidence may be changed by adjusting the height and/or pitch one or more parameters of the individual elements (e.g., grating elements) of the in-coupling optical elements.

For example, the in-complete optical elements of a display device may be configured such that light of a first color incident at positive incident angles is in-coupled by the corresponding in-coupling optical element into a waveguide that is configured to in-couple light of a second color such that the first color image projected from the waveguide causes perceptible ghosting. In such an embodiment, the in-coupling optical element may be displaced along a direction to avoid the first color light incident at the positive incident angles to reduce ghosting.

In display devices comprising waveguides associated with multiple depth planes, the in-coupling optical elements of waveguides associated with different depth planes may be separated from each other without any spatial overlap. This may be advantageous in reducing accidental in-coupling of light corresponding to an image for a waveguide associated with a different depth plane.

Figure 17:
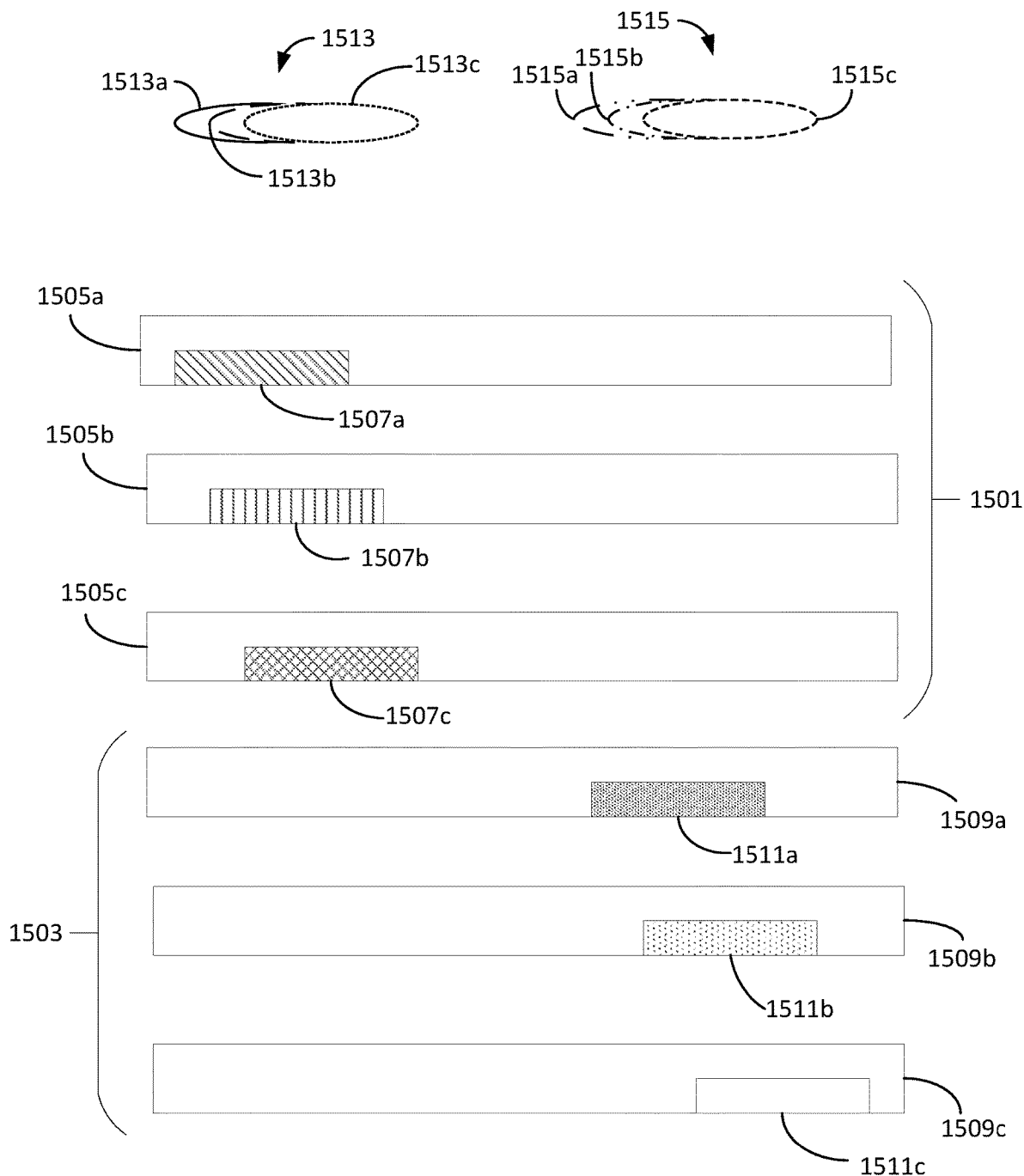
FIG. 17 schematically illustrates a side-view of an example of a stacked waveguide assembly for a dual depth plane display system.

FIG. 17 illustrates an embodiment of a display device comprising waveguides associated with two different depth planes. A first waveguide stack 1501 is associated with a first depth plane D1. The first waveguide stack 1501 comprises waveguides 1505a, 1505b, and 1505c, each waveguide of the first waveguide stack 1501 being configured to in-couple a different color of light (e.g., red, green or blue) corresponding to a first depth plane image projected from an exit pupil 1513 of a projector. The light is in-coupled into waveguides 1505*a*, 1505*b*, and 1505*c* using in-coupling optical elements 1507*a*, 1507*b*, and 1507*c* respectively. In various embodiments, the in-coupling optical elements 1507*a*, 1507*b*, and 1507*c* may be spatially separated from each other such that they partially overlap as discussed above. As discussed above, the direction of displacement and the amount of lateral displacement between the individual in-coupling optical elements 1507*a*, 1507*b*, and 1507*c* may be configured to improve at least one of a brightness, a contrast ratio and/or a resolution as perceived by an average human eye of the first depth plane image that is projected out of the first waveguide stack 1501 (e.g., by reducing the occurrence of ghost images outputted from underlying waveguides).

In some embodiments, the exit pupil 1513 is configured to project the first depth plane image and may comprise a single pupil that emits the different colors of light corresponding to the first depth plane image. Alternately, in various embodiments, the exit pupil 1513 may comprise multiple exit pupils 1513*a*, 1513*b*, and 1513*c*, each configured to emit the different colors of light corresponding to the first depth plane image. In such embodiments, each of the multiple exit pupils 1513*a*, 1513*b*, and 1513*c* may be disposed to be substantially vertically aligned with the corresponding in-coupling optical element 1507*a*, 1507*b*, and 1507*c* respectively that is configured to in-couple the emitted color of light.

The display device depicted in FIG. 17 comprises a second waveguide stack 1503 associated with a second depth plane D2. The second waveguide stack 1503 comprises waveguides 1509*a*, 1509*b*, and 1509*c*, each configured to in-couple a different color of light (e.g., red, green or blue) for displaying a second depth plane image projected from an exit pupil 1515 of a projector. The waveguides 1509*a*, 1509*b*, and 1509*c* in-couple light using in-coupling optical elements 1511*a*, 1511*b*, and 1511*c*, respectively. In various embodiments, the in-coupling optical elements 1511*a*, 1511*b*, and 1511*c* may be spatially separated from each other such that they partially overlap as discussed above. As discussed above, the direction of displacement and the amount of lateral displacement between the individual in-coupling optical elements 1511*a*, 1511*b*, and 1511*c* may be configured to improve at least one of a brightness, a contrast ratio and/or a resolution as perceived by an average human eye of the second depth plane image that is projected out of the second waveguide stack 1503 (e.g., by reducing the occurrence of ghost images outputted from underlying waveguides).

In some embodiments, the exit pupil 1515 configured to project the second depth plane image may comprise a single pupil that emits the different colors of light corresponding to the first depth plane image. Alternately, in various embodiments, the exit pupil 1515 configured to project the second depth plane image may comprise multiple exit pupils 1515*a*, 1515*b*, and 1515*c* configured to emit the different colors of light corresponding to the second depth plane image. In such embodiments, each of the multiple exit pupils 1515*a*, 1515*b*, and 1515*c* may be disposed to be substantially vertically aligned with the corresponding in-coupling optical element 1511*a*, 1511*b*, and 1511*c* respectively that is configured to in-couple the emitted color of light.

As noted from FIG. 17, the exit pupils 1513 and 1515 that project the first and the second depth plane images as well as the in-coupling optical elements 1507*a*-1507*c* and 1511*a*-1511*c* that are configured to in-couple the first and the second depth plane images are spatially separated without any overlap (as seen in a top-down view from the perspective of the exit pupils). Spatially separating the exit pupils 1513 and 1515 that project the first and the second depth plane images as well as the in-coupling optical elements 1507*a*-1507*c* and 1511*a*-1511*c* that are configured to in-couple the first and the second depth plane images without any overlap may reduce the in-coupling of second depth plane image in the first waveguide stack 1501 and vice-versa. The exit pupils 1513 and 1515 that output the light of first and the second depth plane images as well as the in-coupling optical elements 1507*a*-1507*c* and 1511*a*-1511*c* may be spatially separated along a lateral direction and/or along a transverse direction in the plane of the waveguides 1505*a*-1505*c* and 1509*a*-1509*c*.

Various examples of devices (e.g., optical devices, display devices, illuminators, integrated optical devices, etc.) and systems (e.g., illumination systems) have been provided. Any of these devices and/or systems may be included in a head mounted display system to couple light (e.g., with one or more in-coupling optical elements) into a waveguide and/or eyepiece to form images. In addition, the devices and/or systems may be relatively small (e.g., less than 1 cm) such that one or more of the devices and/or systems may be included in a head mounted display system. For example, the devices and/or systems may be small with respect to the eyepiece (e.g., less than a third of the length and/or width of the eyepiece).

In the foregoing specification, the invention has been described with reference to specific embodiments thereof. It will, however, be evident that various modifications and changes may be made thereto without departing from the broader spirit and scope of the invention. For example, while discussed in some examples with reference to a projector having multiple pupils for outputting light (e.g., multiple exit pupils), it will be appreciated that any source of image light, or plurality of sources of image light, may be utilized to provide image light for in-coupling into the in-coupling optical elements. As an example, multiple projectors may be utilized in some embodiments to provide image light to the in-coupling optical elements. In addition, in some figures, in an orientation where light from a projector is directed downwards toward a waveguide, the in-coupling optical elements are shown as being disposed along the rearward or bottom major surface of a waveguide and, thus, to work in a reflection mode (so that incident light is in-coupled into the waveguide by reflecting the light at angles appropriate for TIR within the waveguide). In some other embodiments, in an orientation where light from a projector is directed downwards toward a waveguide, the in-coupling optical elements may be disposed on the forward or upper major surface of the waveguide and, thus, work in the transmissive mode (so that incident light is in-coupled into the waveguide by transmitting the light through the in-coupling optical element, with the light exiting the in-coupling optical element at angles appropriate for TIR within the waveguide). The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially exampled as such, one or more features from an example combination may in some cases be excised from the combination, and the exampled combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended examples are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following examples. In some cases, the actions recited in the examples may be performed in a different order and still achieve desirable results.

Accordingly, the disclosure are not intended to be limited to the embodiments shown herein, but are to be accorded the widest scope consistent with this disclosure, the principles and the novel features disclosed herein.

What is claimed:

1. A display system comprising:
    a stack of waveguides comprising:
        a first waveguide comprising:
            a first absorptive optical filter transmissive to light of a first range of wavelengths and absorptive to light of wavelengths different from the first range of wavelengths;
            a first in-coupling optical element configured to receive light transmitted through the first absorptive optical filter; and
            a first waveguide having a first major surface and a second major surface, wherein the first in-coupling optical element is configured to incouple light of the first range of wavelengths into the first waveguide;
        a second waveguide comprising:
            a first major surface and a second major surface; and
            a second in-coupling optical element configured to incouple light, transmitted through the first absorptive optical filter and the first in-coupling optical element and having a second range of wavelengths different from the first range of wavelengths, into the second waveguide; and
        a third waveguide, wherein the third waveguide is rearward of the first waveguide and comprising:
            a first major surface and a second major surface; and
            a third in-coupling optical element configured to incouple light having a third wavelength range into the third waveguide; and
            a third absorptive optical filter forward of the third in-coupling optical element and between the second waveguide and the third waveguide.

2. The display system of claim 1, wherein the first in-coupling optical element is on the first major surface of the first waveguide or the second major surface of the first waveguide.

3. The display system of claim 1, further comprising a second absorptive optical filter on one or both of the first or second major surfaces of the first waveguide, wherein, as seen in a top-down view, the first absorptive optical filter is laterally displaced from the second absorptive optical filter.

4. The display system of claim 1, wherein the first absorptive optical filter comprises a dye.

5. The display system of claim 1, wherein the first in-coupling optical element is configured to transmit light having a range of wavelengths different from the first range of wavelengths.

6. The display system of claim 1, wherein at least a portion of the first in-coupling optical element and at least a portion of the second in-coupling optical element laterally overlap with each other, as seen in a top down view.

7. The display system of claim 1, wherein the third in-coupling optical element is on one of the first major surface of the third waveguide or the second major surface of the third waveguide.

8. The display system of claim 1, wherein at least a portion of the third in-coupling optical element laterally overlaps with the first in-coupling optical element and the second in-coupling optical element.

9. The display system of claim 1, wherein the third absorptive optical filter comprises a dye.

10. The display system of claim 1, wherein the second in-coupling optical element is on the first major surface of the second waveguide or the second major surface of the second waveguide.

11. The display system of claim 10, wherein the second waveguide is forward of the first waveguide, further comprising:

a third absorptive optical filter on a major surface of the second waveguide and laterally displaced from the second in-coupling optical element, the third absorptive optical filter configured to absorb incoupled light having a wavelength different from the second range of wavelengths.

12. The display system of claim 11, wherein the third absorptive optical filter comprises a dye.

13. A display system comprising:
a stack of waveguide assemblies comprising:
a first waveguide assembly comprising:
a first waveguide having a first major surface and a second major surface; and
a first in-coupling optical element configured to receive a first incoming beam of light, wherein the first in-coupling optical element is configured to incouple light into the first waveguide from the first incoming beam of light having a first wavelength range;
a second waveguide assembly comprising:
a second waveguide having a first major surface and a second major surface; and
a second in-coupling optical element configured to receive a second incoming beam of light, wherein the second in-coupling optical element is configured to incouple light into the second waveguide light, from the second incoming beam of light having a second wavelength range, wherein the first in-coupling optical element and the second in-coupling optical element are laterally displaced from each other as seen in a top-down view facing major surfaces of the first and second waveguides; and
a third waveguide assembly comprising:
a third waveguide having a first major surface and a second major surface;
a third in-coupling optical element configured to receive the first incoming beam of light, wherein the third in-coupling optical element is configured to incouple light into the third waveguide from the first incoming beam of light having a third wavelength range different from the first wavelength range and the second wavelength range;
an optical filter between the first waveguide and the third waveguide, the optical filter configured to absorb light from the first incoming beam of light having the first wavelength range and transmit light from the first incoming beam of light having the third wavelength range; and
a fourth optical filter on one of the first or second major surfaces of the third waveguide, wherein the fourth optical filter is between the second waveguide and the third waveguide, the fourth optical filter configured to:
absorb light having the first wavelength range and the second wavelength range and
transmit light having the third wavelength range.

14. The display system of claim 13, wherein at least a portion of the first in-coupling optical element overlaps with a portion of the third in-coupling optical element, as seen in a top-down view.

15. The display system of claim 13, further comprising a second optical filter on one of the first or second major surfaces of the first waveguide, the second optical filter laterally displaced from the first in-coupling optical element, as seen in a top-down view, wherein the second optical filter configured to absorb incoupled light in the first waveguide having a wavelength range different from the first wavelength range.

16. The display system of claim 13, further comprising a third optical filter on one of the first or second major surfaces of the second waveguide, the third optical filter laterally displaced from the second in-coupling optical element, the third optical filter configured to absorb incoupled light in the second waveguide having a wavelength range different from the second wavelength range.

17. A display system comprising:
a projection system for outputting image light for forming a full-color image; and
a stack of waveguides comprising:
a first waveguide having a first in-coupling optical element configured to receive the image light and to in-couple image light of a first component color; and
a second waveguide underlying the first waveguide, and having a second in-coupling optical element configured to receive the image light and to in-couple image light of a second component color, wherein the first in-coupling optical element and the second in-coupling optical element are laterally displaced relative to one another by 5-50% of a shortest width of the first and second in-coupling optical elements, as seen in a top-down view.

18. The display system of claim 17, wherein the first in-coupling optical element and the second in-coupling optical element are laterally displaced relative to one another by 10-25% of the shortest width of the first and second in-coupling optical elements, as seen in a top-down view.

19. The display system of claim 17, wherein the projection system has a single exit-pupil for outputting the image light.

20. The display system of claim 17, further comprising a color filter in a light path of the image light, the color filter disposed between the first and second in-coupling optical elements.

21. The display system of claim 20, wherein the color filter is laterally displaced relative to the first in-coupling optical element by a same amount as the second in-coupling optical element.

22. The display system of claim 20, wherein the color filter is an absorptive color filter.

23. The display system of claim 17, further comprising a third waveguide underlying the second waveguide, and having a third in-coupling optical element configured to receive the image light and to in-couple image light of a third component color.

24. The display system of claim 23, wherein the third in-coupling optical element is laterally displaced relative to the second in-coupling optical element by 5-50% of a shortest width of the second and third in-coupling optical elements, as seen in a top-down view.

25. The display system of claim 23, wherein:
the first, second, and third in-coupling optical elements constitute a first set of waveguides for forming images on a first depth plane; and
further comprising a second set of waveguides for forming images on a second depth plane, wherein the first set of waveguides and the second set of waveguides output light with different amounts of wavefront divergence from one another.

26. The display system of claim 25, wherein the second set of waveguides comprises fourth, fifth, and sixth waveguides, each having respective fourth, fifth, and sixth in-coupling optical elements.

27. The display system of claim 26, wherein the fourth in-coupling optical element and the fifth in-coupling optical element are laterally displaced relative to one another by 5-50% of a shortest width of the fourth and fifth in-coupling optical elements, as seen in a top-down view.

28. The display system of claim 27, wherein the fifth in-coupling optical element and the sixth in-coupling optical element are laterally displaced relative to one another by 5-50% of a shortest width of the fifth and sixth in-coupling optical elements, as seen in a top-down view.

* * * * *